(12) United States Patent
Freda et al.

(10) Patent No.: US 12,490,335 B2
(45) Date of Patent: Dec. 2, 2025

(54) SERVICE CONTINUITY ASSOCIATED WITH WTRU TO WTRU RELAYS

(71) Applicant: InterDigital Patent Holdings, Inc., Wilmington, DE (US)

(72) Inventors: Martino M. Freda, Laval (CA); Jaya Rao, Montreal (CA); Tuong Duc Hoang, Montreal (CA); Tao Deng, Roslyn, NY (US); Moon-il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 357 days.

(21) Appl. No.: 17/925,260

(22) PCT Filed: May 19, 2021

(86) PCT No.: PCT/US2021/033165
§ 371 (c)(1),
(2) Date: Nov. 14, 2022

(87) PCT Pub. No.: WO2021/236774
PCT Pub. Date: Dec. 5, 2021

(65) Prior Publication Data
US 2023/0232487 A1 Jul. 20, 2023

Related U.S. Application Data

(60) Provisional application No. 63/026,945, filed on May 19, 2020.

(51) Int. Cl.
*H04W 76/23* (2018.01)
*H04W 88/04* (2009.01)

(52) U.S. Cl.
CPC ............ *H04W 76/23* (2018.02); *H04W 88/04* (2013.01)

(58) Field of Classification Search
CPC .............................. H04W 76/23; H04W 88/04
See application file for complete search history.

(56) References Cited

U.S. PATENT DOCUMENTS

| 2004/0166853 A1 | 8/2004 | Takeda et al. |
| 2010/0329148 A1 | 12/2010 | Won et al. |

(Continued)

FOREIGN PATENT DOCUMENTS

| EP | 3185612 A1 | 6/2017 |
| JP | 2004254237 A | 9/2004 |
| WO | 2017/196611 A1 | 11/2017 |

OTHER PUBLICATIONS

3rd Generation Partnership Project (3GPP), RP-193253, "New SID: Study on NR Sidelink Relay", OPPO, 3GPP TSG RAN Meeting #86, Sitges, Spain, Dec. 9-12, 2019, pp. 1-5.
3rd Generation Partnership Project (3GPP), Tr 36.746 V15.1.1, "Technical Specification Group Radio Access Network, Study on further enhancements to LTE Device to Device (D2D), User Equipment (UE) to network relays for Internet of Things (IOT) and wearables, (Release 15)", Apr. 2018, pp. 1-55.

(Continued)

*Primary Examiner* — Timothy X Pham
(74) *Attorney, Agent, or Firm* — Condo Roccia Koptiw LLP

(57) ABSTRACT

Method and WTRU enabled for service continuity using WTRU-to-WTRU relays. A relay path may be modeled as an SLRB, RLC leg of an SLRB, and/or a MAC logical channel. The WTRU adds a path for a destination based on configured/usable relays. The WTRU may associate an end-to-end L2 destination ID with one or more path L2 destination IDs or path IDs. Upper layers select one or more paths for transmission of a packet/bearer. The WTRU may send a relay announcement message containing path connectivity information. A WTRU may select a path for transmission based on properties associated with a sidelink. The WTRU may activate/deactivate an SL bearer, unicast link, L2 destination, and/or RLC Leg. The WTRU changes a bearer (Continued)

associated with an SLRB from an established RLC entity to another established RLC entity.

20 Claims, 10 Drawing Sheets

(56) References Cited

U.S. PATENT DOCUMENTS

| | | | |
|---|---|---|---|
| 2017/0353819 | A1 | 12/2017 | Yin et al. |
| 2019/0335518 | A1 | 10/2019 | Dimitrovski et al. |
| 2021/0243829 | A1* | 8/2021 | Paladugu ............... H04W 80/02 |
| 2021/0321365 | A1* | 10/2021 | Damnjanovic ...... H04W 72/542 |
| 2023/0074899 | A1* | 3/2023 | Wang .................... H04W 40/12 |
| 2023/0199875 | A1* | 6/2023 | Back ...................... H04W 76/14 |
| | | | 370/329 |
| 2023/0337299 | A1* | 10/2023 | Zhang ..................... H04L 45/66 |
| 2023/0345558 | A1* | 10/2023 | Zhao ...................... H04W 76/14 |
| 2025/0056349 | A1* | 2/2025 | Esswie .................. H04W 36/22 |

OTHER PUBLICATIONS

3rd Generation Partnership Project (3GPP), TS 36.300 V15.4.0, "Technical Specification Group Radio Access Network, Evolved Universal Terrestrial Radio Access (E-UTRA) and Evolved Universal Terrestrial Radio Access Network (E-UTRAN), Overall description, Stage 2 (Release 15)", Dec. 2018, pp. 1-363.

3rd Generation Partnership Project (3GPP), TS 36.331 V16.0.0, "Technical Specification Group Radio Access Network, Evolved Universal Terrestrial Radio Access (E-UTRA), Radio Resource Control (RRC), Protocol Specification (Release 16)", Mar. 2020, pp. 1-1048.

3rd Generation Partnership Project (3GPP), TS 38.300 V16.1.1.

3rd Generation Partnership Project, 3GPP RP-192791, "Key Points on Sidelink Relay SID", 3GPP TSG RAN Meeting #86; Sitges, Spain; Agenda item: 9.1.2; Source: Huawei, HiSilicon, Dec. 9-12, 2019, 8 pages.

* cited by examiner

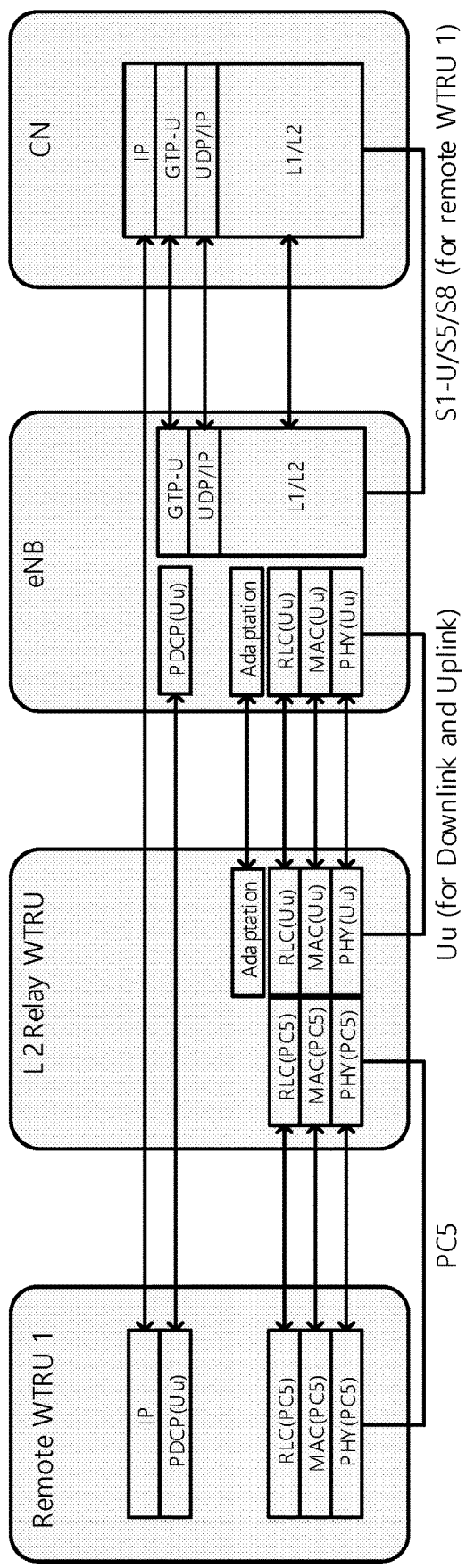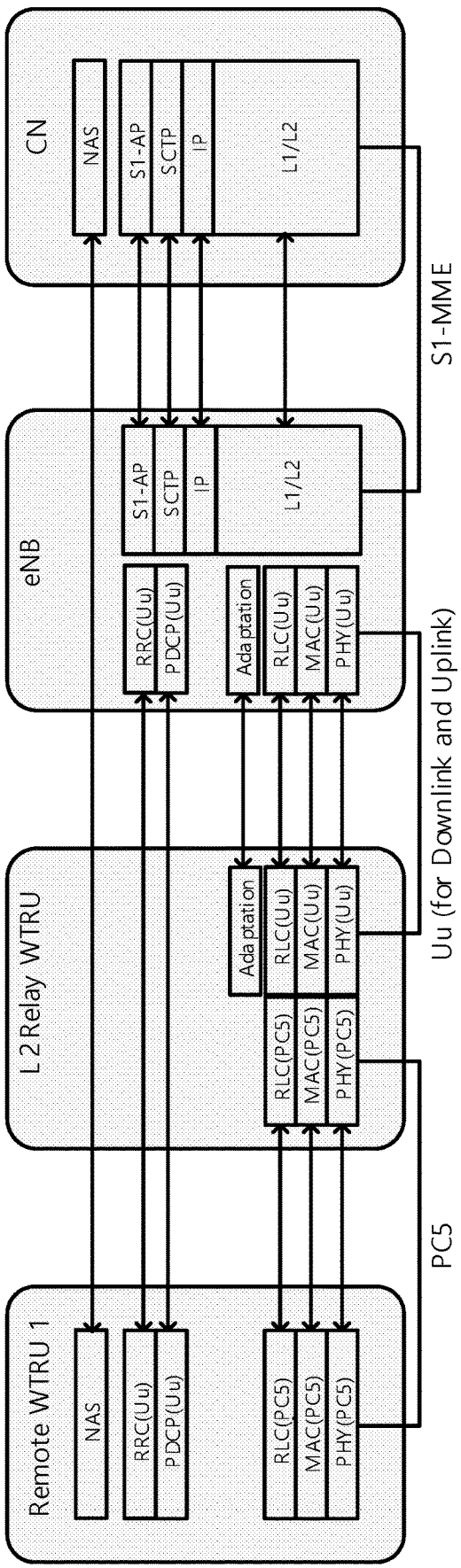
FIG. 2
FIG. 3

SERVICE CONTINUITY ASSOCIATED WITH WTRU TO WTRU RELAYS

CROSS-REFERENCE TO RELATED APPLICATIONS

This application is the National Stage Entry under 35 U.S.C. § 371 of Patent Cooperation Treaty Application No. PCT/US2021/033165, filed May 19, 2021, which claims the benefit of U.S. Provisional Application No. 63/026,945, filed May 19, 2020, and titled "Service Continuity Associated with WTRU to WTRU Relays," the contents of all which are hereby incorporated herein by reference in their entireties.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein associated with service continuity using WTRU relays. A source wireless transmit/receive unit (WTRU) may establish a radio bearer for communication with a communication device, which may be a destination WTRU. The source WTRU may create for the radio bearer, which may be a sidelink radio bearer (SLRB), a new communication path associated with a relay adapted to communicate with the communication device.

The source WTRU may identify the relay, which may be a WTRU relay, that is adapted to provide relaying to the destination WTRU. The source WTRU may receive a message from the relay and may determine, based on the message, whether the relay is adapted to provide relaying to the destination WTRU.

The source WTRU, if it determines that the relay is adapted to provide relaying to the destination WTRU, may determine if the relay may be used to provide a path to the destination WTRU. The source WTRU may determine if a parameter associated with the relay satisfies one or more thresholds associated with the radio bearer. The source WTRU may determine whether a quality of service (QoS), a channel busy ratio (CBR), and/or number of hops associated with the relay satisfy corresponding thresholds associated with the radio bearer.

If the source WTRU determines that the relay may be used to provide a path to the secondary WTRU, the source WTRU may reconfigure the radio bearer to accommodate the relay. The source WTRU may reconfigure the radio bearer by triggering a sidelink reconfiguration.

If the reconfiguration of the radio bearer is successful, the source WTRU may add a path associated with the relay to the radio bearer. The source WTRU may add the path associated with the relay by adding a radio link control (RLC) entity and associating the RLC entity with the relay.

The source WTRU may transmit data to the destination WTRU via the path associated with the relay.

A relay path may be modeled, for example, as a sidelink radio bearer (SLRB), a radio link control (RLC) leg of an SLRB, and/or a medium access control (MAC) logical channel. A wireless transmit/receive unit (WTRU) may add, remove, and/or reconfigure a path and/or may determine a number of paths for a destination, for example, based on configured and/or usable relays. Addition, removal, and/or reconfiguration of a path may be conditioned and/or triggered, for example, by sidelink factors. A WTRU may associate an end to end L2 destination identifier (ID) with one or more path L2 destination IDs or path IDs. Upper layers may select one or more paths for transmission of a packet and/or bearer. A WTRU may send a relay announcement message that may include path connectivity information.

A WTRU may select a path for transmission, for example, based on one or more properties associated with a sidelink, such as a mapping and/or restriction of quality of service (QoS) flows to one or more paths, a value of one or more QoS parameters in a QoS profile, a measured channel busy ratio (CBR) at the WTRU, a transmission rate associated with a (e.g., each) path, transmission rate requirements associated with the data, information received from another WTRU (e.g., a relay WTRU), a feedback status, measurements of a sidelink, a number of hops and/or a type of path, a reception of data/control from a peer WTRU, and/or criteria for a direct path.

A WTRU may activate and/or deactivate an SL bearer, a unicast link, an L2 destination, and/or an RLC leg. Triggers may be provided for activation and/or deactivation. WTRU actions may be based on activation and/or deactivation. A WTRU may initiate measurement reporting on a link, for example, based on a link status of another link. A WTRU may determine an initial activation and/or deactivation state. A WTRU may change the RLC entity and/or bearer associated with an SLRB from an established RLC entity to another established RLC entity.

A WTRU may create, e.g., for a (e.g., specific) sidelink radio bearer (SLRB), a separate RLC entity for one or more (e.g., each) of the L2 destination IDs that are configured as a relay for an end-to-end destination ID (e.g., the same end-to-end destination ID), and/or for which sidelink (re) configuration with the relay (e.g., a peer WTRU used as a relay) is successful. An RLC entity/leg (e.g., each RLC entity/leg) may be associated with a relayed path to a destination. A WTRU may perform one or more of the following. The WTRU may initiate a sidelink reconfiguration with a relay WTRU, for example, if the relay WTRU is added by upper layers for the same destination (e.g., ID) as a destination of an existing SLRB. The WTRU may reconfigure the SLRB (e.g., to add an RLC entity/leg associated with the relay), for example, if the sidelink reconfiguration is successful.

A WTRU (e.g., service data adaptation layer (SDAP) layer) may map a QoS flow to an SLRB, for example, based on a maximum number of hops, e.g., associated with one or more of the created RLC entities (e.g., legs) of the SLRB. A WTRU may perform one or more of the following. The WTRU may receive an indication of (e.g., a change of) a number of hops in a path, e.g., associated with an SLRB from a peer (e.g., relay) WTRU for a path. The WTRU may compare the maximum number of hops of a leg (e.g., any leg) of the SLRB, for example, to a maximum number of hops allowable for a QoS flow currently mapped to the SLRB. The WTRU may (e.g., if the maximum allowable number of hops for a QoS flow is exceeded) re-map the QoS flow to a different SLRB allowed for the QoS flow (e.g., if a different SLRB exists) or may initiate creation of an SLRB (e.g., a new SLRB).

A WTRU may activate or deactivate a path for transmission of data to a peer (e.g., destination) WTRU, inform the peer WTRU of the activation/deactivation, determine the ratio of data to be transmitted on an activated path (e.g., each activated path), and/or transmit data to the peer WTRU on activated path(s) based on the determined ratio. Activation and/or deactivation and the ratio may be determined, for example, based on a path CBR and/or channel occupancy ratio (CR) reported by a peer WTRU. A WTRU may perform one or more of the following. A WTRU may activate or deactivate a path for transmission of data to a destination WTRU. The WTRU may determine whether to activate or deactivate the path, for example, based on CBR and/or CR for the path reported by the peer WTRU. The WTRU may send an activation/deactivation indication to the peer (e.g., relay) WTRU, for example, based on activation/deactivation of the path. An activated path may be a path that a WTRU can use to transmit data to a peer (e.g., destination) WTRU. A path may comprise, for example, a separate SLRB, a separate RLC leg of an SLRB, and/or a separate MAC logical channel that may be used for transmission to the destination (e.g., via a different relay). A WTRU may determine the ratio of data intended for the destination to be transmitted via one or more (e.g., each) of the activated paths, for example, based on the ratio between the received CBR and/or CR measurements from the peer WTRU for a (e.g., each) path. The WTRU may transmit the data for the destination to the one or more (e.g., each of the) activated paths, for example, based on the determined ratio.

This Summary is provided to introduce a selection of concepts in a simplified form. The concepts are further described herein in the Detailed Description. This Summary is not intended to limit the scope of the claimed subject matter. Other features are described herein.

BRIEF DESCRIPTION OF THE DRAWINGS

FIG. 2 is a diagram illustrating an example of a user plane radio protocol stack for layer 2 evolved WTRU-to-Network relay.

FIG. 3 is a diagram illustrating an example of a control plane radio protocol stack for layer 2 evolved WTRU-to-Network relay.

EXAMPLE NETWORKS FOR IMPLEMENTATION OF THE EMBODIMENTS

Figure 1A:
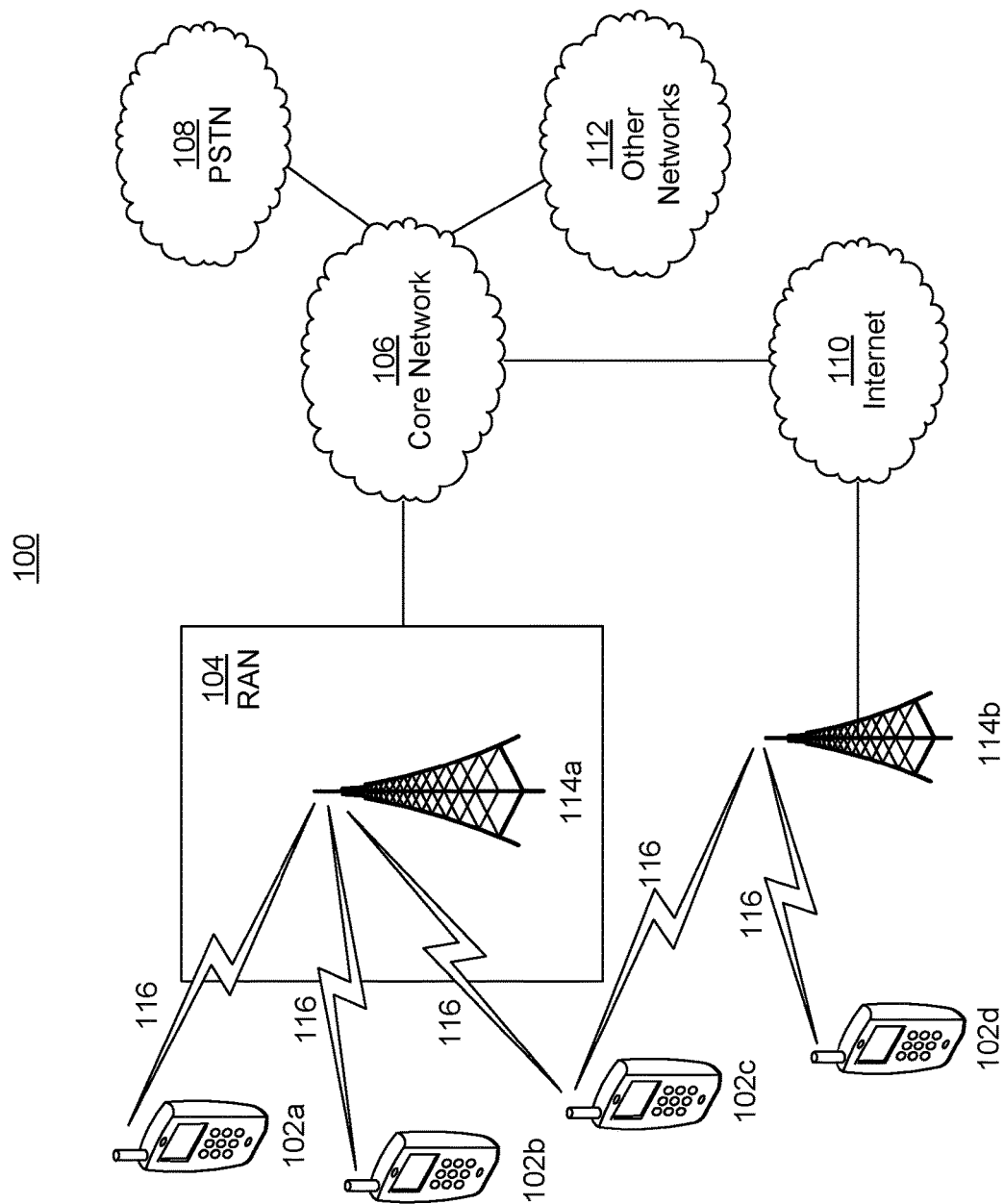
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a 'station' and/or a 'STA', may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like.

The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
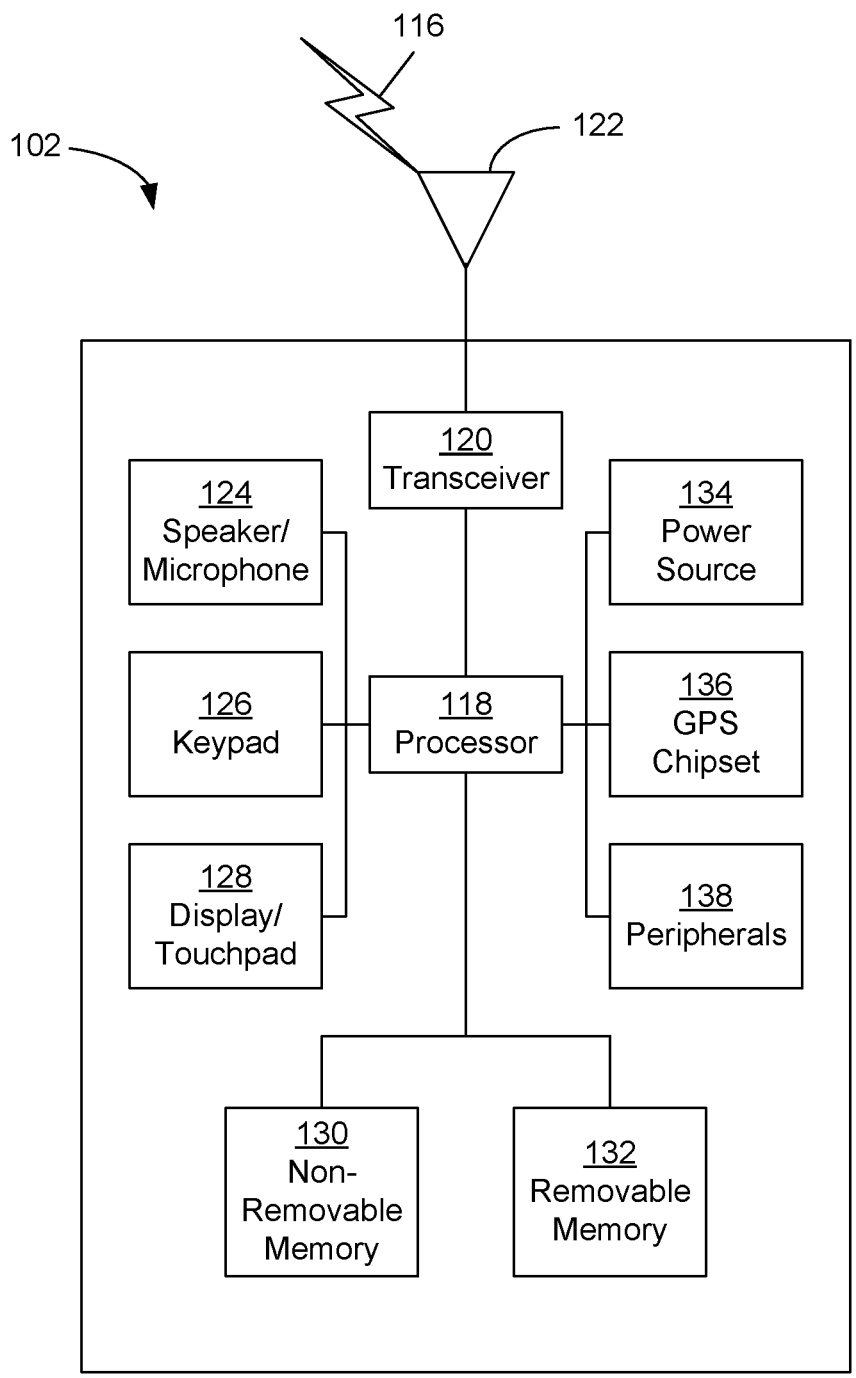
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
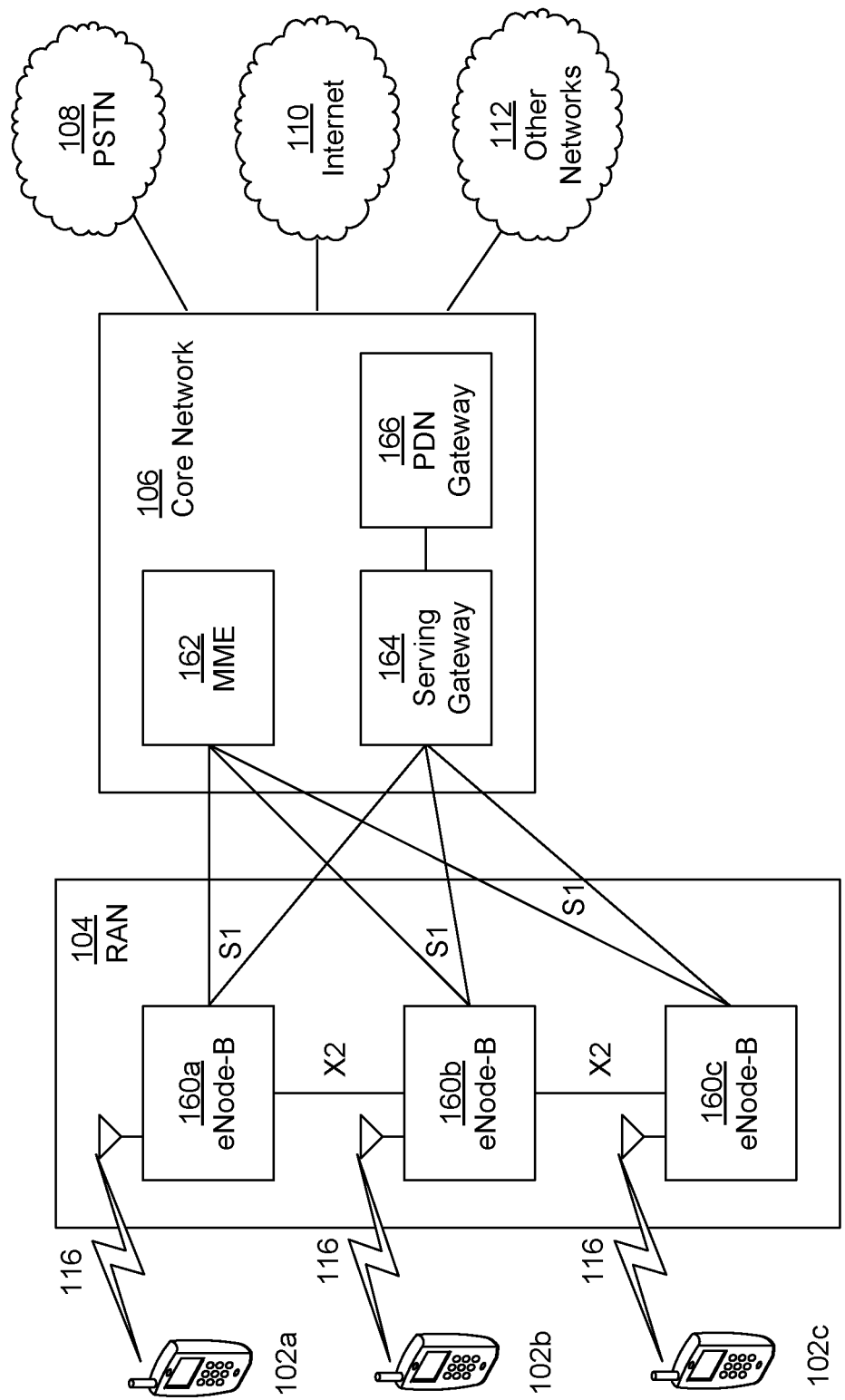
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80480 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80480 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
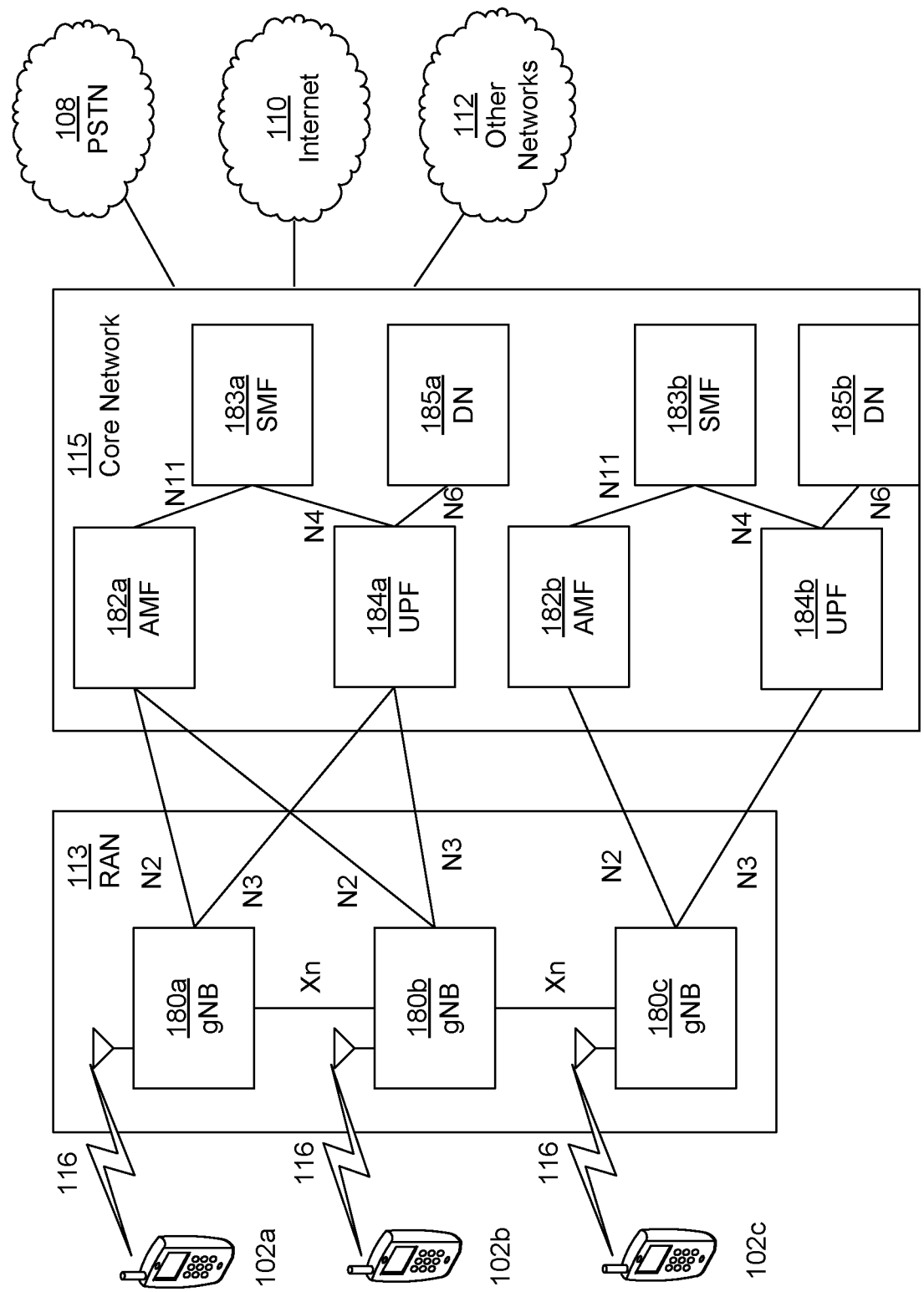
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

NR sidelink relay may support WTRU-to-network relays and WTRU-to-WTRU relays. NR sidelink may support vehicle-to-everything (V2X) related road safety services. Support may be provided for broadcast, groupcast and unicast communications in out-of-coverage and in-network coverage scenarios. Sidelink-based relaying functionality may support sidelink/network coverage extension and power efficiency improvement, e.g., for a wide range of applications and services.

Coverage extension may be provided for sidelink-based communication. WTRU-to-network coverage extension may be provided. Uu coverage reachability may permit WTRUs to reach a server in a PDN network or a counterpart WTRU outside a proximity area. WTRU-to-network relay coverage extension may utilize evolved universal terrestrial radio access (EUTRA)-based technology, which may not be applicable to an NR-based system, e.g., for NG-RAN and NR-based sidelink communication. WTRU-to-WTRU coverage extension may be provided. Proximity reachability may be applied to a single-hop sidelink link (e.g., via EUTRA-based or NR-based sidelink), which may, e.g., not, be applicable, for example, if there is no Uu coverage. Sidelink connectivity may be (e.g., further) extended in an NR framework, for example, to support enhanced quality of service (QoS).

Single hop NR sidelink relays may support sidelink-based WTRU-to-network and WTRU-to-WTRU relays, for example, based on implementation of relay (re-)selection; relay/remote WTRU authorization; QoS for relaying operations; service continuity; security of a relayed connection; a user plane protocol stack and control plane procedure (e.g., connection management of relayed connection). Upper layer operations (e.g., discovery model/procedure) for sidelink relaying may be supported (e.g., without a new physical layer channel/signal). A WTRU-to-network relay and WTRU-to-WTRU relay may use the same relaying implementation. A WTRU-to-network relay may implement an end-to-end packet data convergence protocol (PDCP) and hop-by-hop radio link control (RLC).

WTRU to Network Relays may be implemented. Relaying may be implemented, for example, via proximity services (ProSe) WTRU-to-network relays, for example, to extend network coverage to an out of coverage WTRU, e.g., by using PC5 (e.g., device-to-device (D2D)) communication between an out of coverage WTRU and a WTRU-to-Network relay.

A ProSe WTRU-to-Network Relay may provide an (e.g., a generic) L3 forwarding function that may relay (e.g., any type of) internet protocol (IP) traffic between a remote WTRU and the network. One-to-one and one-to-many sidelink communications may be used between remote WTRU(s) and a ProSe WTRU-to-Network relay. A (e.g., only one) single carrier (e.g., public safety ProSe carrier) operation may be supported (e.g., Uu and PC5 may be the same carrier for Relay/Remote WTRU), for example, for Remote WTRU and Relay WTRU. A Remote WTRU may be authorized by upper layers. A Remote WTRU may be in-coverage of a public safety ProSe carrier or out-of-coverage on (e.g., any) supported carriers (e.g., including a public safety ProSe carrier) for WTRU-to-Network Relay discovery, (re)selection and communication. A ProSe WTRU-to-Network Relay may be, e.g., may be always, in-coverage of an EUTRA network (EUTRAN). A ProSe WTRU-to-Network Relay and a Remote WTRU may perform sidelink communication and sidelink discovery.

Relay selection for WTRU-to-NW relays may be provided. Relay selection/reselection for ProSe WTRU-to-NW relays may be performed, for example, based on a combination of an access stratum (AS) layer quality measurements (e.g., reference signal received power (RSRP)) and upper layer criteria.

An eNB may control whether a WTRU can act as a ProSe WTRU-to-Network Relay. ProSe WTRU-to-Network Relay operation may be supported in a cell, for example, if an eNB broadcasts any information that may be associated with ProSe WTRU-to-Network Relay operation.

An eNB may provide transmission resources for ProSe WTRU-to-Network Relay discovery, e.g., using broadcast signaling for a radio resource control (RRC) idle state (RRC_IDLE state) and dedicated signaling for an RRC_CONNECTED state. An eNB may provide reception resources for ProSe WTRU-to-Network Relay discovery, e.g., using broadcast signaling. An eNB may broadcast a minimum and/or a maximum Uu link quality (e.g., RSRP) threshold(s) that a ProSe WTRU-to-Network Relay may need, e.g., before initiating a WTRU-to-Network Relay discovery procedure. A WTRU may (e.g., in RRC_IDLE, if an eNB broadcasts transmission resource pools) use the threshold(s), for example, to (e.g., autonomously) start or stop a WTRU-to-Network Relay discovery procedure. A WTRU may (e.g., in RRC_CONNECTED) use the threshold(s) to determine, for example, if the WTRU can indicate to an eNB that the WTRU is a Relay WTRU and wants to start ProSe WTRU-to-Network Relay discovery. A WTRU may initiate a request for ProSe-WTRU-to-Network Relay discovery resources (e.g., by dedicated signaling, respecting broadcasted threshold(s)), for example, if an eNB does not broadcast transmission resource pools for ProSe-WTRU-to-Network Relay discovery.

A ProSe-WTRU-to-Network Relay may perform ProSe WTRU-to-Network Relay discovery (e.g., in RRC_IDLE), for example, if the ProSe-WTRU-to-Network Relay is initiated by broadcast signaling. A ProSe WTRU-to-Network Relay may perform relay discovery (e.g., in RRC_CONNECTED), for example, if the ProSe WTRU-to-Network Relay is initiated by dedicated signaling.

A ProSe WTRU-to-Network Relay that may perform (e.g., is performing) sidelink communication for ProSe WTRU-to-Network Relay operation may be in RRC_CONNECTED. A ProSe WTRU-to-Network Relay may receive a layer-2 link establishment request or TMGI monitoring request (e.g., upper layer message) from a Remote WTRU. The ProSe WTRU-to-Network Relay may indicate to an eNB that it is a ProSe WTRU-to-Network Relay and intends to perform ProSe WTRU-to-Network Relay sidelink communication. The eNB may provide resources for ProSe WTRU-to-Network Relay communication.

A remote WTRU may decide when to start monitoring for ProSe WTRU-to-Network Relay discovery. The Remote WTRU may transmit ProSe WTRU-to-Network Relay discovery solicitation messages, for example, while in RRC_IDLE or in RRC_CONNECTED, e.g., depending on the configuration of resources for ProSe WTRU-to-Network Relay discovery. An eNB may broadcast a threshold, which may be used by the Remote WTRU, for example, to determine if the Remote WTRU can transmit ProSe WTRU-to-Network Relay discovery solicitation messages, e.g., to connect or communicate with a ProSe WTRU-to-Network Relay WTRU. The RRC_CONNECTED Remote WTRU may use the broadcasted threshold to determine, for example, if it may indicate to the eNB that it is a Remote WTRU and wants to participate in ProSe WTRU-to-Network Relay discovery and/or communication. The eNB may provide transmission resources (e.g., using broadcast or dedicated signaling) and reception resources (e.g., using broadcast signaling) for ProSe WTRU-to-Network Relay Operation. The Remote WTRU may stop using ProSe WTRU-to-Network Relay discovery and communication resources, for example, if RSRP goes above the broadcasted threshold. The time of traffic switching from Uu to PC5 or vice versa may be determined by a higher layer.

A Remote WTRU may perform radio measurements (e.g., at a PC5 interface) and may use the measurements (e.g., with higher layer criterion) for ProSe WTRU-to-Network Relay selection and reselection. A ProSe WTRU-to-Network Relay may be considered suitable (e.g., in terms of radio criteria), for example, if the PC5 link quality exceeds a configured threshold (e.g., pre-configured or provided by an eNB). The Remote WTRU may select a ProSe WTRU-to-Network Relay that satisfies higher layer criterion and provides the highest PC5 link quality among (e.g., all) suitable ProSe WTRU-to-Network Relays. The Remote WTRU may trigger ProSe WTRU-to-Network Relay reselection, for example, if (i) the PC5 signal strength of a current ProSe WTRU-to-Network Relay is below a configured signal strength threshold; and/or (ii) the Remote WTRU receives a layer-2 link release message (e.g., an upper layer message) from the ProSe WTRU-to-Network Relay.

WTRU-to-Network Relays may be provided for wearables. WTRU-to-NW relays may support wearables and IoT devices in a RAN. ProSe WTRU-to-NW relays may use an L3 (e.g., IP layer) relay.

WTRU-to-NW relays for wearables may use, for example, an L2 relay.

FIG. 2 is a diagram illustrating an example of a user plane radio protocol stack for layer 2 evolved WTRU-to-Network relay (e.g., with a PC5 interface).

FIG. 3 is a diagram illustrating an example of a control plane radio protocol stack for layer 2 evolved WTRU-to-Network relay (e.g., with a PC5 interface).

Connection establishment may be provided for unicast links in NR V2X. A relay implementation (e.g., for LTE) may be based on, for example, a one-to-one communication link established at upper layers (e.g., a ProSe layer) between multiple (e.g., two) WTRUs (e.g., a remote WTRU and a WTRU-to-NW relay). A connection may be transparent to the AS layer. Connection management signaling and procedures performed at the upper layers may be carried by AS layer data channels. The AS layer may be unaware of a one-to-one connection.

An AS layer may (e.g., in NR V2X) support a unicast link between multiple (e.g., two) WTRUs. A unicast link may be initiated, for example, by upper layers (e.g., as in a ProSe one-to-one connection). The AS layer may be informed of the presence of a unicast link and any data that may be transmitted in unicast fashion between the peer WTRUs. The AS layer may (e.g., with this knowledge) support hybrid automatic repeat request (HARQ) feedback, channel quality indicator (CQI) feedback, and power control schemes (e.g., that may be specific to unicast).

A unicast link at the AS layer may be supported, for example, via a PC5-RRC connection. A PC5-RRC connection may be, for example, a logical connection between a pair of a Source Layer-2 ID and a Destination Layer-2 ID in the AS. A (e.g., one) PC5-RRC connection may correspond to a (e.g., one) PC5 unicast link. PC5-RRC signaling may be initiated, for example, after a corresponding PC5 unicast link establishment. A PC5-RRC connection and corresponding sidelink signaling radio bearers (SRBs) and sidelink data radio bearer (DRBs) may be released, for example, if a PC5 unicast link is released (e.g., as may be indicated by upper layers).

In an example of a (e.g., each) PC5-RRC connection of unicast, a (e.g., one) sidelink SRB may (e.g., be used to) transmit the PC5-S messages, for example, before the PC5-S security has been established. A (e.g., one) sidelink SRB may (e.g., be used to) transmit the PC5-S messages to establish the PC5-S security. A (e.g., one) sidelink SRB may (e.g., be used to) transmit the PC5-S messages, for example, after the PC5-S security has been established. The PC5-S messages may be protected. A (e.g., one) sidelink SRB may (e.g., be used to) transmit the PC5-RRC signaling, which may be protected and sent (e.g., only) after the PC5-S security has been established.

PC5-RRC signaling may include a sidelink configuration message (e.g., RRCReconfigurationSidelink), for example, where a WTRU may configure the RX-related parameters of a (e.g., each) SLRB in a peer WTRU. A reconfiguration message may configure the parameters of a (e.g., each) protocol in the L2 stack (e.g., service data adaptation layer (SDAP), packet data convergence protocol (PDCP), etc.). The receiving WTRU may confirm or reject a configuration, for example, depending on whether the receiving WTRU can support the configuration suggested by the peer WTRU.

Service continuity and/or lack of service interruption may be goals for WTRU-to-WTRU relays using sidelink. A V2X service may be (e.g., may need to be) carried out through a relay WTRU. A service may be (e.g., may need to be) maintained with little to no interruption in the application, for example, if a direct path between two WTRUs fails (e.g., and a relay may be introduced) or if a current relay is no longer appropriate (e.g., and a new relay may be employed).

Establishment of a unicast link may involve upper layer link establishment signaling followed by radio bearer establishment at the AS layer. Procedures to establish a unicast link may involve a signaling exchange between multiple (e.g., two) WTRUs, which may result in service interruption, which may be exacerbated, for example, if unicast link establishment (e.g., via a relay) is performed following a failure of a previous unicast link. One or more features may manage sidelink (SL) radio bearers, for example, to mitigate/avoid SL service interruption. Some sidelink use cases (e.g., V2X) may involve high mobility environments. Transmission paths (e.g., via different WTRU-to-WTRU relays) may (e.g., be expected to) change (e.g., frequently). QoS requirements of a service may be maintained, for example, even during (e.g., frequent) path changes.

A source WTRU may establish a new communication path for an established radio bearer associated with communicating with a destination WTRU. The source WTRU may identify a relay that is adapted to provide relaying to the destination WTRU. The source WTRU may receive a message from the relay and determine, based on the message, whether the relay is adapted to provide relaying to the destination WTRU.

If the source WTRU determines that the relay is adapted to provide relaying to the destination WTRU, it may determine if the relay may be used to provide a path to the destination WTRU. The source WTRU may determine if a parameter associated with the relay satisfies one or more thresholds associated with the radio bearer. The source WTRU may determine whether a quality of service (QoS), a channel busy ratio (CBR), and/or number of hops associated with the relay satisfy corresponding thresholds associated with the radio bearer.

If the source WTRU determines that the relay may be used to provide a path to the secondary WTRU, the source WTRU may reconfigure the radio bearer to accommodate the relay. The source WTRU may reconfigure the radio bearer by triggering a sidelink reconfiguration.

If the reconfiguration of the radio bearer is successful, the source WTRU may add a path associated with the relay to the radio bearer. The source WTRU may add the path associated with the relay by adding a radio link control (RLC) entity and associating the RLC entity with the relay. The source WTRU may transmit data to the destination WTRU via the path associated with the relay.

A WTRU may create, e.g., for a (e.g., specific) sidelink radio bearer (SLRB), a separate RLC entity for one or more (e.g., each) of the L2 destination IDs that are configured as a relay for an end-to-end destination ID (e.g., the same end-to-end destination ID), and/or for which sidelink (re) configuration with the relay (e.g., a peer WTRU used as a relay) is successful. An RLC entity/leg (e.g., each RLC entity/leg) may be associated with a relayed path to a destination. A WTRU may perform one or more of the following. The WTRU may initiate a sidelink reconfiguration with a relay WTRU, for example, if the relay WTRU is added by upper layers for the same destination (e.g., ID) as a destination of an existing SLRB. The WTRU may reconfigure the SLRB (e.g., to add an RLC entity/leg associated with the relay), for example, if the sidelink reconfiguration is successful.

A WTRU (e.g., service data adaptation layer (SDAP) layer) may map a QoS flow to an SLRB, for example, based on a maximum number of hops, e.g., associated with one or more of the created RLC entities (e.g., legs) of the SLRB. A WTRU may perform one or more of the following. The WTRU may receive an indication of (e.g., a change of) a number of hops in a path, e.g., associated with an SLRB from a peer (e.g., relay) WTRU for a path. The WTRU may compare the maximum number of hops of a leg (e.g., any leg) of the SLRB, for example, to a maximum number of hops allowable for a QoS flow currently mapped to the SLRB. The WTRU may (e.g., if the maximum allowable number of hops for a QoS flow is exceeded) re-map the QoS flow to a different SLRB allowed for the QoS flow (e.g., if a different SLRB exists) or may initiate creation of an SLRB (e.g., a new SLRB).

A WTRU may activate or deactivate a path for transmission of data to a peer (e.g., destination) WTRU, inform the peer WTRU of the activation/deactivation, determine the ratio of data to be transmitted on an activated path (e.g., each activated path), and/or transmit data to the peer WTRU on activated path(s) based on the determined ratio. Activation and/or deactivation and the ratio may be determined, for example, based on a path CBR and/or channel occupancy ratio (CR) reported by a peer WTRU. A WTRU may perform one or more of the following. A WTRU may activate or deactivate a path for transmission of data to a destination WTRU. The WTRU may determine whether to activate or deactivate the path, for example, based on CBR and/or CR for the path reported by the peer WTRU. The WTRU may send an activation/deactivation indication to the peer (e.g., relay) WTRU, for example, based on activation/deactivation of the path. An activated path may be a path that a WTRU may use to transmit data to a peer (e.g., destination) WTRU. A path may comprise, for example, a separate SLRB, a separate RLC leg of an SLRB, and/or a separate MAC logical channel that may be used for transmission to the destination (e.g., via a different relay). A WTRU may determine the ratio of data intended for the destination to be transmitted via one or more (e.g., each) of the activated paths, for example, based on the ratio between the received CBR and/or CR measurements from the peer WTRU for a (e.g., each) path. The WTRU may transmit the data for the destination to the one or more (e.g., each of the) activated paths, for example, based on the determined ratio.

SL service continuity may be maintained, for example, via WTRU-to-WTRU relays. Service continuity may be provided for (e.g., in the context of) sidelink transmissions that may be performed, for example, via a sidelink WTRU-to-WTRU relay. Service continuity discussed herein may be applied to service continuity in other contexts, such as, but not limited to, WTRU-to-network (NW) relays where, for example, different paths may be between multiple (e.g., two) different WTRU=to-NW relays, or between a WTRU-to-NW relay and a direct Uu connection.

SL transmissions via different relay paths may be implemented with one or more architecture features described herein. A WTRU may transmit data from a (e.g., single) QoS flow via (e.g., over) multiple paths. Multiple paths may correspond to different relay paths (e.g., relayed via a WTRU-to-WTRU relay versus non-relayed, or relayed via a first WTRU-to-WTRU relay versus relayed via a second WTRU-to-WTRU relay). A WTRU may be associated with an L2 destination identifier (ID) for a path. A WTRU may use an L2 destination in its transmissions to the path.

An architecture for SL transmissions via different relay paths may include, for example, a single bearer, multiple RLC leg model. A WTRU may associate an SL bearer with one or more L2 destination IDs and/or one or more transmission paths (e.g., using different RLC/MAC entities). In an example architecture, a WTRU may use a single bearer for transmission of one or more QoS flows to a destination WTRU, for example, via multiple (e.g., two) different paths and/or destination L2 IDs. A WTRU may create multiple RLC entities for the bearer. A WTRU may associate an (e.g., each) RLC entity of the bearer with transmissions to a different L2 ID. In examples (e.g., as shown in FIG. 4), a first RLC entity may be associated with a first L2 destination ID, and a second RLC entity may be associated with a second L2 ID.

Figure 4:
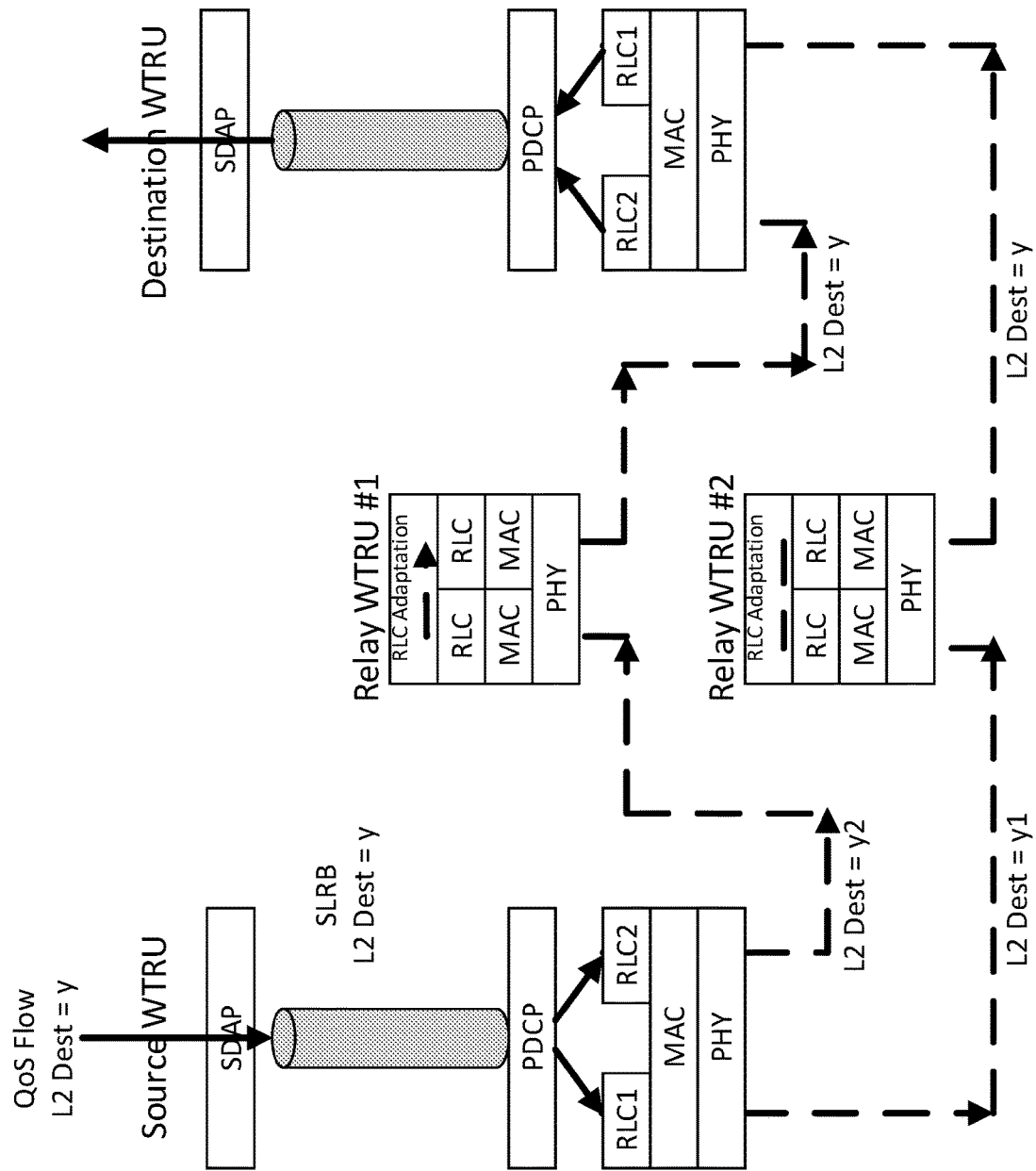
FIG. 4 is a diagram illustrating an example of a WTRU using a single bearer with multiple RLC entities to transmit QoS flow(s) to a destination WTRU via multiple paths and/or destination L2 IDs.
Figure 5:
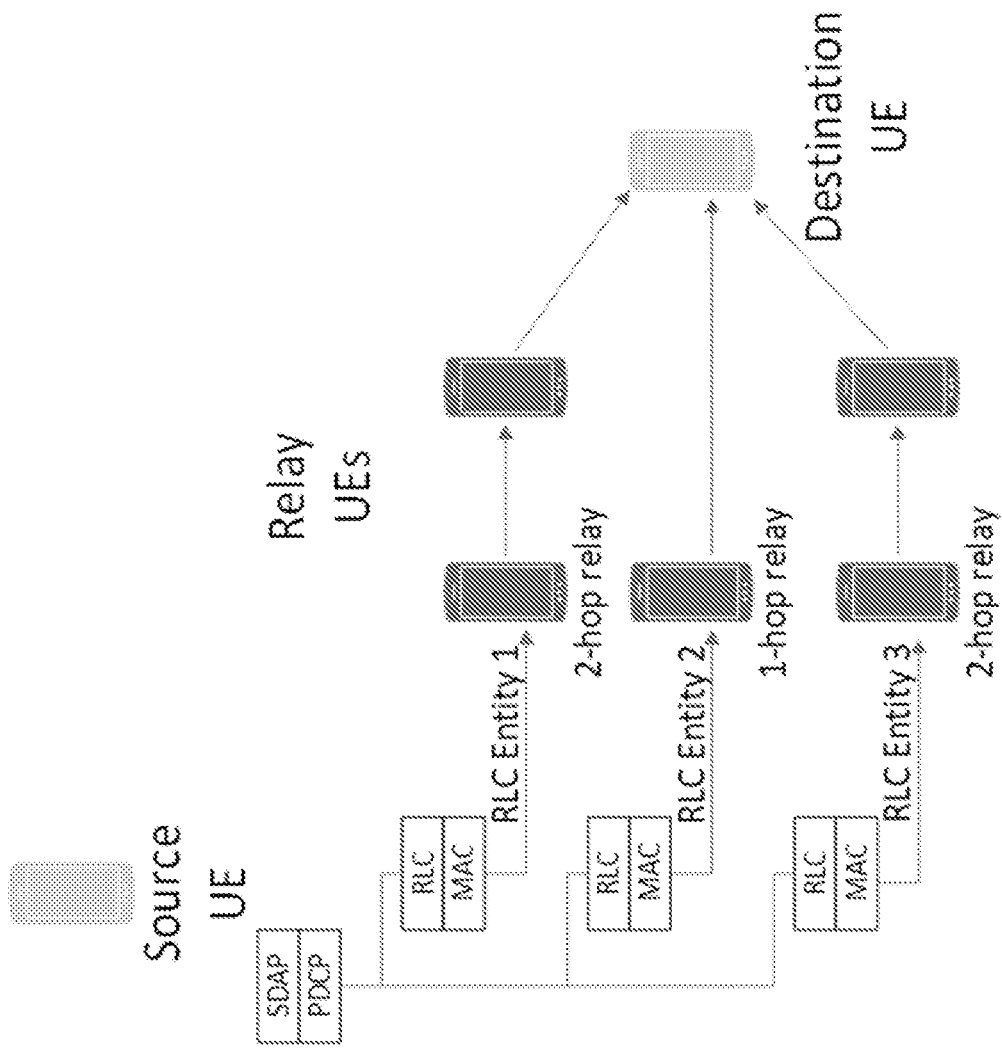
FIG. 5 is a diagram illustrating an example of a WTRU with multiple RLC entities to transmit flow(s) to a destination WTRU.

FIG. 4 is a diagram illustrating an example of a WTRU using a single bearer with multiple RLC entities to transmit QoS flow(s) to a destination WTRU via multiple paths and/or destination L2 IDs. FIG. 5 is a diagram depicting another example. A WTRU may associate the PDCP entity of the bearer with a (e.g., one) L2 ID (e.g., the target WTRU L2 ID). The WTRU may (e.g., further) associate an RLC entity (e.g., each of multiple RLC entities) of the PDCP entity with another L2 ID (e.g., where one may be the same as the L2 ID of the PDCP entity itself). For example (e.g., as shown in FIG. 4), y may consist of the target WTRU L2 ID. The bearer may (e.g., then) be associated with multiple (e.g., two) RLC entities (y1 and y2), where y1 and y2 may correspond, for example, to the L2 Is of each relay WTRU. Path selection/switching may be performed by the PDCP layer.

An architecture for SL transmissions via different relay paths may include, for example, a single bearer, single RLC leg model. A WTRU may associate an SL bearer with one or more L2 destination IDs and/or one or more transmission paths (e.g., using single RLC/MAC entities). In an example architecture, a WTRU may use a single bearer for transmission of one or more QoS flow(s) to a destination WTRU, for example, via multiple (e.g., two) different paths and/or destination L2 IDs. A WTRU may create an (e.g., a single) RLC entity for the bearer. A WTRU MAC layer may decide (e.g., based on reception of a PDU), which path and/or destination L2 ID to use for transmission of the path. An example is shown in FIG. 6.

Figure 6:
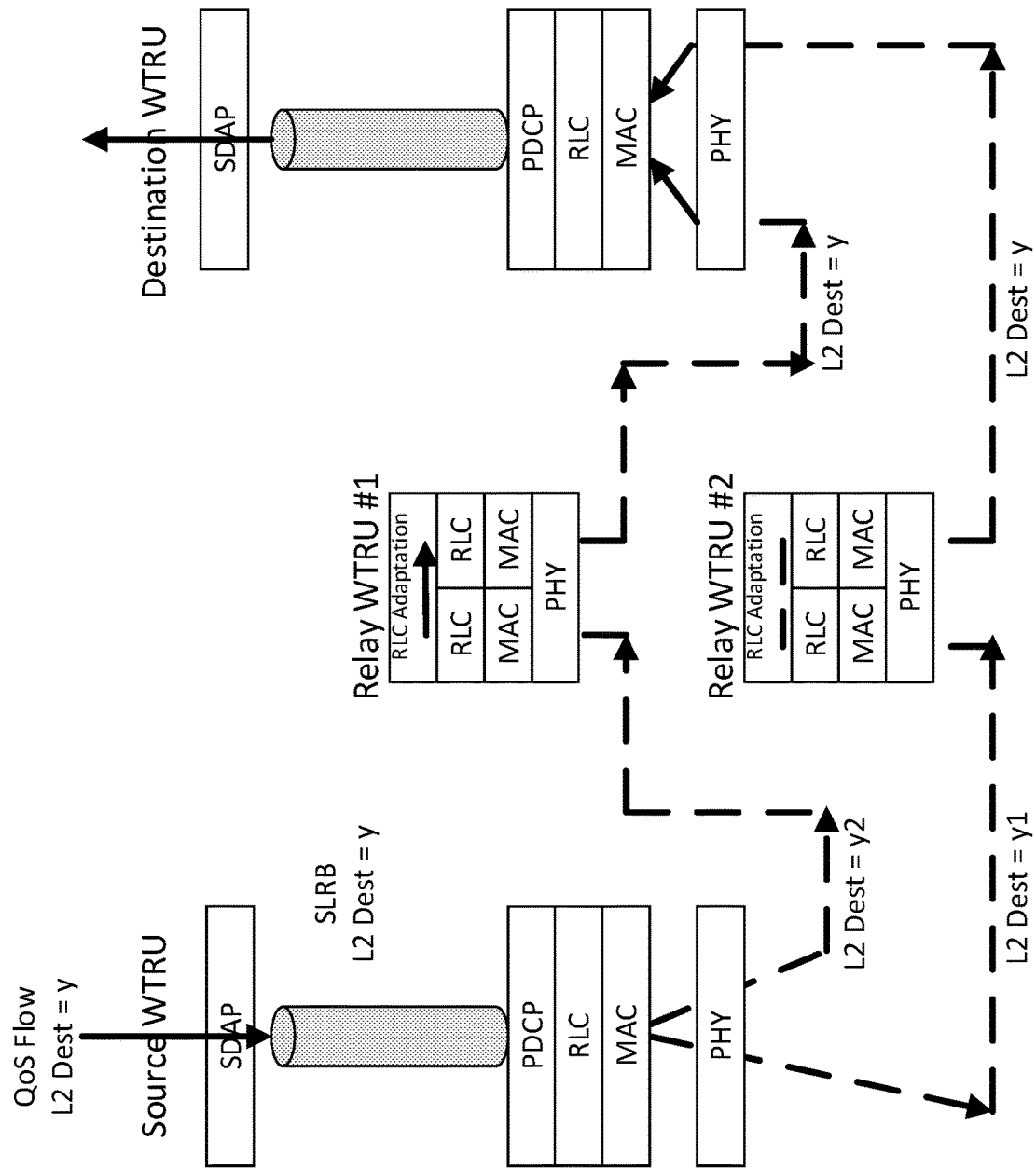
FIG. 6 is a diagram illustrating an example of a WTRU using a single bearer with a single RLC entity to transmit QoS flow(s) to a destination WTRU via multiple paths and/or destination L2 IDs.

FIG. 6 is a diagram illustrating an example of a WTRU using a single bearer with a single RLC entity to transmit QoS flow(s) to a destination WTRU via multiple paths and/or destination L2 IDs. A WTRU may associate the PDCP entity of the bearer with a (e.g., one) L2 ID (e.g., the target WTRU L2 ID). The WTRU may (e.g., further) associate a set of actual (e.g., next hop) L2 IDs to be used for the bearer. The MAC layer may (e.g., at transmission) decide which next hop L2 ID to use for transmission of a specific SDU and may include the L2 ID in the header of the MAC PDU. For example (e.g., as shown in FIG. 6), y may consist of the target WTRU L2 ID. The bearer may (e.g., then) be associated with multiple (e.g., two) next hop L2 IDs (e.g., y1 and y2), where y1 and y2 may correspond to the L2 IDs of each relay WTRU. Path selection/switching may be performed by the MAC layer.

An architecture for SL transmissions via different relay paths may include, for example, a multiple bearer model. A WTRU may be configured with one or more bearers that may carry a QoS flow. In an example architecture, a WTRU may use one or more bearers to carry a QoS flow. A WTRU may (e.g., for multiple bearers) associate more than one bearer (e.g., by allowing a QoS flow to be mapped on one or more of the two or more bearers).

Figure 7:
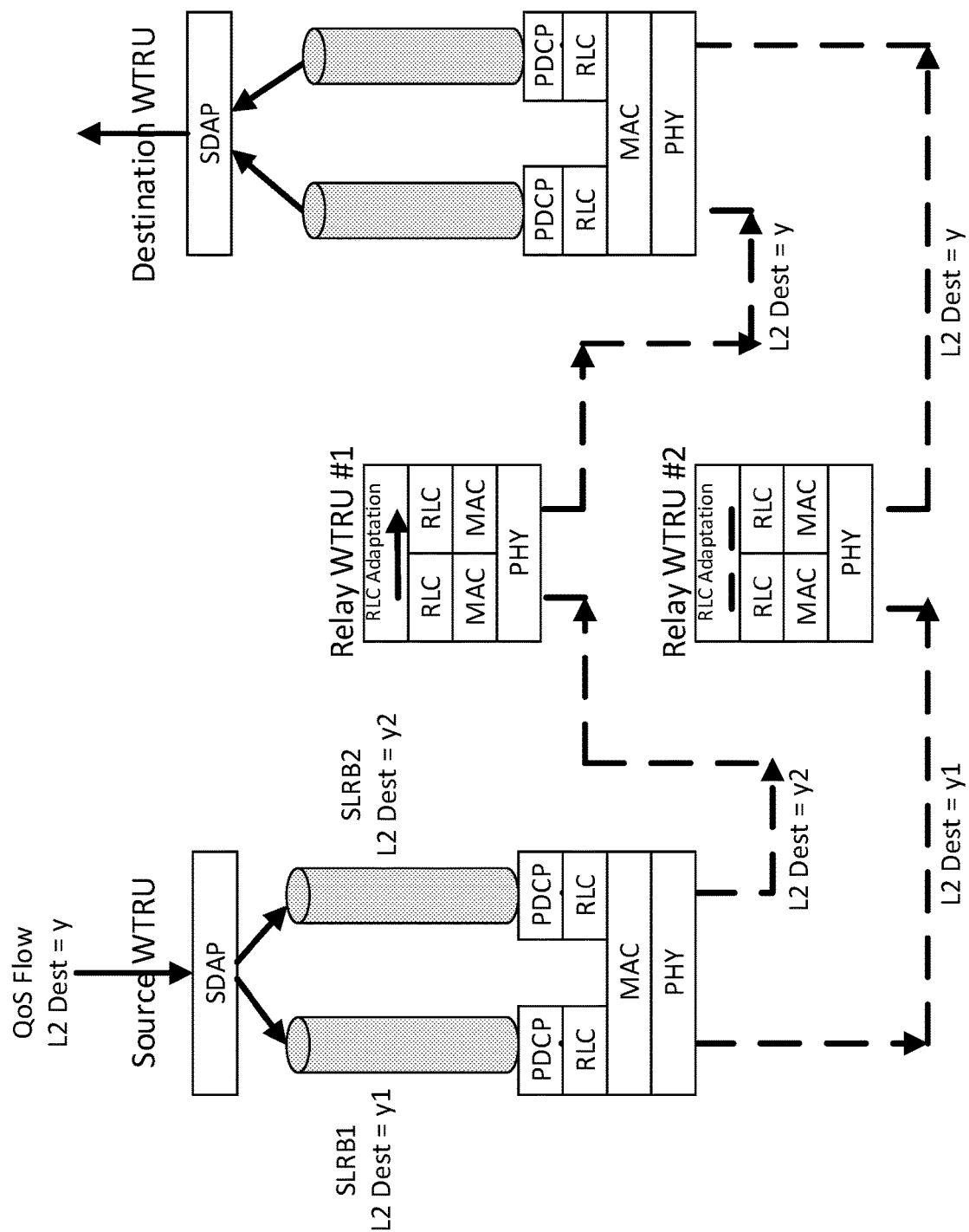
FIG. 7 is a diagram illustrating an example of a WTRU using multiple bearers to transmit QoS flow(s) to a destination WTRU via multiple paths and/or destination L2 IDs.

FIG. 7 is a diagram illustrating an example of a WTRU using multiple bearers to transmit QoS flow(s) to a destination WTRU via multiple paths and/or destination L2 IDs. A WTRU may associate each bearer with a different L2 ID. The multiple L2 IDs may be linked to a single L2 ID that may be indicated from upper layers. For example (e.g., as shown in FIG. 7), y may be associated with the flow to be sent over any of multiple bearers, y1 may (e.g., also) be associated with bearer 1, and y2 may be associated with bearer 2. The WTRU may maintain an association between the L2 ID provided from the upper layers (e.g., y) and the L2 IDs that may be associated with each of multiple bearers (e.g., y1 and y2), for example, as described in further examples herein. Path selection/switching may be performed, for example, by the SDAP layer.

A WTRU may implement one or more functions for path redundancy via sidelink WTRU-to-WTRU Relays. Interruption time on sidelink may be reduced, for example, by allowing multiple paths (e.g., through different relays, or a direct path) to be active at the same time.

Figure 8:
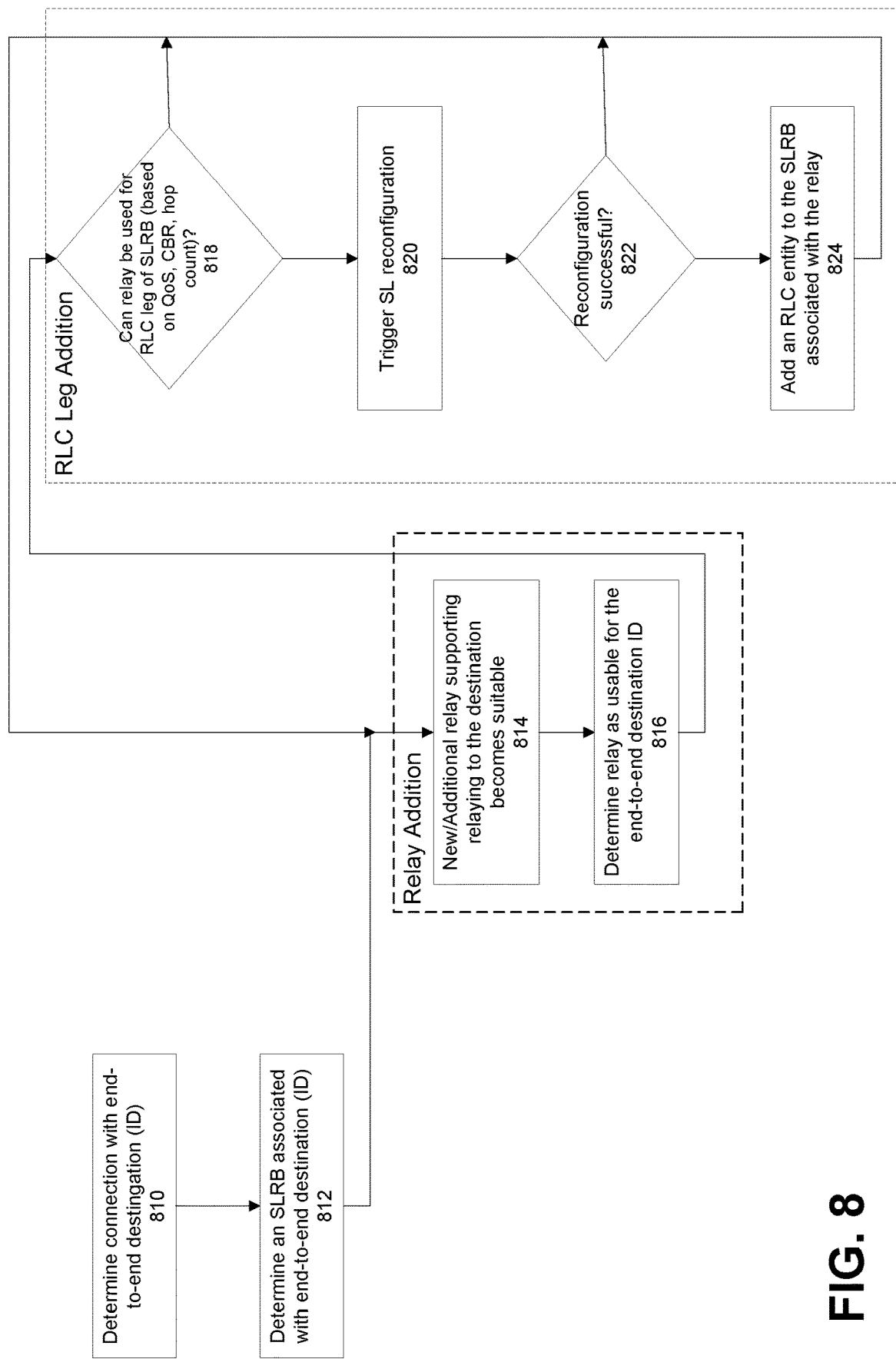
FIG. 8 is a diagram illustrating example processing for adding a path for an existing bearer to a destination WTRU.

A WTRU may add, remove, and/or reconfigure a path and/or may determine a number of paths for a destination, for example, based on configured and/or usable relays. FIG. 8 depicts example processing consistent with descriptions herein. In examples, a WTRU may add/remove a path that may be associated with a data transmission of one or more QoS flows for an end-to-end destination, for example, based on the number of configured relays for the destination. A path may be, for example, one or more of an RLC leg, an SLRB, and/or a logical channel. A WTRU may receive one or more relays that may be associated with a destination (e.g., an end-to-end destination ID). A WTRU may receive the relays, for example, from one or more upper layers, from the NW (e.g., AS layer), and/or as the result of a relay determination procedure (e.g., identify relay(s) based on a relay selection involving the WTRU itself) (e.g., FIG. 8 at 814, 816). A WTRU may determine the number of paths to create, for example, based on the number of relays associated with the destination. A WTRU may receive an indication (e.g., from one or more upper layers), about (e.g., indicating) the usable relays for an end-to-end destination. A WTRU may create a path, for example, based on a (e.g., successful) connection/configuration of the path via the relay.

A WTRU may initiate a sidelink configuration procedure (e.g., transmission of a sidelink reconfiguration message) with a (e.g., each) relay WTRU. A WTRU may add the path, for example, based on a (e.g., successful) reconfiguration (e.g., reception of a reconfiguration complete or other message indicating success) (e.g., FIG. 8 at 820, 822, 824). A WTRU may decide to not add a path and/or may inform upper layers and/or a network of the failure to add a path, for example, based on reception of a reconfiguration failure.

A WTRU may remove a path that may be associated with data transmission of one or more QoS flows, for example, based on an indication (e.g., from upper layer or the NW) to remove a relay or that a relay may no longer be usable for a (e.g., specific) destination.

A WTRU may change the mapping of data (e.g., QoS flow) to a path, for example, based on addition of a relay (e.g., FIG. 8 at 814, 816) and/or a successful reconfiguration, e.g., to allow data for the destination to be transmitted along the new path. Selection of path by a WTRU is discussed further herein.

In examples, a WTRU may (e.g., if a path is associated with an RLC leg) trigger a reconfiguration of an existing SLRB, for example, to add an RLC entity to a (e.g., specific) PDCP entity, e.g., based on a (e.g., successful) reconfiguration of the peer WTRU. (e.g., FIG. 8 at 820, 822, 824). For example, a WTRU configured with an SLRB for an end-to-end destination (e.g., FIG. 8 at 810, 812) may receive (e.g., from upper layers or from a relay selection procedure) an indication of a new relay to be associated with the destination (e.g., FIG. 8 at 814, 816). In an example, a WTRU configured with a first number of RLC entities/legs for a PDCP entity (e.g., corresponding to an end-to-end L2 ID) may trigger an SLRB reconfiguration procedure for an existing SLRB (e.g., to add a new RLC entity/leg for the PDCP entity), for example, based on reception of a success message (e.g., following a sidelink configuration with another WTRU) (e.g., FIG. 8 at 820, 822, 824). A WTRU may (e.g., also) trigger reconfiguration of an SLRB based on removal of a relay WTRU.

In examples, a WTRU may trigger configuration of a SLRB (e.g., a new SLRB) based on addition of a relay path.

A WTRU may initiate configuration of the peer WTRU, e.g., as part of the SLRB configuration (e.g., the new SLRB configuration).

Addition, removal, and/or reconfiguration may be conditioned on and/or triggered by sidelink factors. Addition and/or removal of a path for a usable relay (e.g., as described herein) may occur, for example, based on an indication (e.g., by upper layers, the network, and/or a relay selection procedure) of the addition/removal of a relay WTRU. (e.g., FIG. 8 at 816). Addition/removal may be conditioned on one or more (e.g., a combination) of the following aspects (e.g., after a usable relay has been indicated).

Addition and/or removal may be conditioned on a quality of a current link (e.g., with the destination, or via a relay WTRU). For example, measurements (e.g., as described herein) may be used to determine that the quality of an existing link/bath associated with a destination is no longer acceptable. A WTRU may trigger reconfiguration of an SLRB and/or configuration of a new SLRB, for example, based on a determination about the quality of a link.

Addition and/or removal may be conditioned on QoS characteristics of data being transmitted to a destination. (e.g., FIG. 8 at 818). For example, a WTRU may be configured with a rule to determine whether data being transmitted to a destination (e.g., a QoS flow) requires and/or allows the use of a path or multiple paths. A QoS flow and/or SLRB may be configured, for example, to allow a relayed path and/or with a maximum number of paths allowed. One or more rules may be configured, for example, in an SLRB configuration, a QoS profile, or a QoS profile to SLRB mapping.

Addition and/or removal may be conditioned on channel busy ratio (CBR) or channel occupancy ratio (CR) measurements. (e.g., FIG. 8 at 818). For example, a WTRU may be configured with a rule to allow addition of a relay path if the CRB or CR is below a value (e.g., a threshold). In examples, a rule may be specific to a (e.g., each) QoS flow and/or SLRB. A WTRU may perform path addition (e.g., and associated procedure(s)), for example, if the measured CR/CBR satisfies a rule. A WTRU may perform path removal (e.g., and associated procedure(s)), for example, if the measured CBR/CR no longer satisfies a rule.

Addition and/or removal may be conditioned on a number of hops. (e.g., FIG. 8 at 818). For example, a WTRU may be configured with a rule (e.g., in the QoS profile, SLRB configuration, and/or QoS profile to SLRB mapping) indicating a maximum/allowable number of hops that may be used (e.g., for certain type of data). A WTRU may trigger a reconfiguration for an SLRB and/or may add/release an SLRB, for example, based on a change of the number of hops on a specific path that may affect a specific SLRB, and/or may reconfigure the mapping of data to different SLRB(s) that may be configured for a destination WTRU. In examples, the WTRU may perform one or more of the following. A WTRU may release an SLRB configured for a path (e.g., and may send a release/reconfiguration message to the peer WTRU), for example, if the hop count for the path becomes larger than a maximum hop configured for data being transmitted over that path (e.g., one or more QoS flows). A WTRU may reconfigure an SLRB to remove an RLC entity associated with the SLRB, for example, if the number of hops associated with the RLC entity exceeds a maximum for the mapped data. The WTRU may (e.g., further) send a release/reconfiguration message to the peer WTRU for the path. A WTRU may reconfigure one or more SLRB(s) (e.g., to change the QoS flow to bearer mapping), for example, if the number of allowable hops is exceeded for a QoS flow along a path. For example, a WTRU may select an alternative SLRB to map a QoS flow to (e.g., based on measurements and/or other criteria described herein). The WTRU may bigger a (re)configuration of the new SLRB and/or the original SLRB, for example, to change the QoS flow to mapping for the QoS flow. Addition and/or removal may be conditioned on, for example, one or more aspects related to path selection or activation/deactivation (e.g., as described herein), for example, to determine if and/or when addition/removal/(re)configuration of a path/SLRB may occur.

A WTRU may trigger (re)configuration of an SLRB and/or initiation of a sidelink configuration procedure, for example, if one or more (e.g., a combination) of events (e.g., as described herein) occurs or has been satisfied, for the SLRB. (FIG. at 820).

A WTRU may associate an end to end L2 destination ID with one or more path L2 destination IDs. In examples, a WTRU may be provided with a first (end-to-end) L2 ID for a given QoS flow, packet, and/or SLRB for transmission. A WTRU may (e.g., then) perform selection of a path (e.g., RLC entity or SLRB), for example, based on criteria (e.g., as described herein). A WTRU may (e.g., elect to) send a transmission over one or more (e.g., redundancy) paths. A path may be associated with a second L2 ID. A WTRU may replace/use the second L2 ID for one or more (e.g., all) transmissions that may be associated with the first L2 ID, e.g., following selection of the path for QoS flow, packet, and/or SLRB.

A WTRU may create path (e.g., an RLC entity, or SLRB) for a (e.g., each) L2 ID that may be associated with a path/RLC entity/bearer. A WTRU may release/remove an SLRB entity/SLRB, for example, based on a determination that the L2 ID is no longer usable (e.g., according to information from upper layer(s), the network, and/or another WTRU). A WTRU may determine the L2 Is of the RLC entity or SLRB (e.g., of an association of the SLRBs), for example, based on information from one or more of the following: upper layer(s), the network, and/or another WTRU.

A WTRU may receive information from upper layers. For example, a WTRU may receive the L2 ID for each bearer/RLC entity from upper layers. The WTRU may (e.g., also) receive an association between multiple L2 Is (e.g., for a set of grouped bearers, or RLC entities associated with a single bearer). In examples, upper layer(s) may provide an end-to-end L2 destination ID for a unicast link, e.g., and one or more destination L2 IDs that may be used for a (e.g., each) path/RLC entity/SLRB. The WTRU may associate the provided L2 ID(s) with each path/RLC/SLRB, and may use the L2 ID for SDUs that may be produced by the RLC entity/SLRB. In examples, upper layer(s) may provide a WTRU with one or more usable relay L2 IDs. Upper layer(s) may (e.g., further) indicate which relay L2 ID(s) may be used for a particular end to end L2 ID (e.g., at a given time).

A WTRU may receive information from the network. For example, a WTRU may receive the L2 ID for a (e.g., each) bearer/RLC entity from the gNB (e.g., via dedicated signaling, a system information block (SIB), and/or a (pre)configuration).

A WTRU may receive information from another WTRU. For example, a WTRU may receive the L2 ID for a (e.g., each) bearer/RLC entity from another WTRU. A WTRU (e.g., configured as a relay) may, for example, include the WTRU's ingress relay L2 ID (e.g., destination for other WTRU transmissions) in a message received by the WTRU performing transmission to multiple bearers. A message may be, for example, a PC5-RRC transmission, or a data transmission, which may contain the relay ingress L2 ID (e.g., in an adaptation layer SDU). A message may be a relay announcement message (e.g., as described herein).

A WTRU may associate an end to end L2 destination ID with one or more path IDs. An L2 ID for a path may take the form of a path ID or similar index. A WTRU may be provided an index (e.g., using methods described herein). A WTRU may (e.g., alternatively) self-assign an index, e.g., based on knowledge of a path/RLC entity/SLRB that the WTRU decides to create. A WTRU may decide to create a path/RLC entity/SLRB, for example, based on knowledge of (e.g., information about) the presence of a new path (e.g., via a different relay). Information may be obtained, for example, from sources and/or procedures described herein.

Upper layer(s) may select one or more paths for transmission of a packet/bearer. In examples, a WTRU may receive (e.g., from upper layers) an indication of a path (e.g., among multiple paths) to use for transmission of a packet, QoS flow, etc. An indication of a path may take any of the following forms, for example. Upper layers may tag a packet and/or QoS flow with a selected path, for example, by attaching an L2 ID that identifies the specific path. For example, an indication of the end-to-end destination ID may indicate use of a direct (e.g., a non-relayed path), while indication of an L2 ID that identifies one or more of the relay WTRUs may indicate the use of the specific relay(s). Upper layer(s) may tag a packet and/or a QoS flow with a selected relay index. The index may identify a specific relay to use. In examples, a special value of the index (e.g., 0) may indicate the WTRU should use a direct path. Upper layer(s) may tag a packet and/or QoS flow with multiple L2 IDs, which may indicate that a WTRU may use any of multiple paths. The WTRU AS layer may decide (e.g., based on rules described herein) which path to use. For example, upper layer(s) may allow a packet to be transmitted on any of multiple paths, for example, by tagging the packet and/or QoS flow with the end-to-end L2 ID, while the AS layer may select the path to be taken. Upper layer(s) may indicate a preferred path for a packet and/or QoS flow. The AS layer may prioritize/select the path, for example, if certain conditions (e.g., as described herein) are met. Upper layer(s) may indicate a (e.g., temporary) disabling of a path that may be associated with an L2 ID. A WTRU may use (e.g., only) an alternative path during the time of disabling.

A WTRU may send a relay announcement message containing path connectivity information. A relay WTRU may send a message (e.g., broadcast or unicast to a source WTRU) indicating, for example, one or more of the following information: (i) an L2 ID of the next hop WTRU and/or end-to-end destination ID served by the relay; and/or (ii) a number of relay hops to reach the destination ID. A relay WTRU may send a message, for example, if the above information changes (e.g., a hop is added/removed between the WTRU and the destination). A relay WTRU that receives a message may transmit a (e.g., its own) message, for example, by using information in the received message. A relay WTRU may receive a message and may transmit the (e.g., same) message, for example, with the hop count increased by 1, and/or by adding/replacing the relay WTRU's own L2 ID within the message. A source WTRU may use a message, for example, to determine the hop count for a given path during path selection for a QoS flow.

A WTRU may select a path for transmission, for example, based on one or more properties that may be associated with sidelink. A mapping/restriction of QoS flows to one or more paths may be provided. In examples, a WTRU may select a path for transmission of a QoS flow, packet, and/or SLRB based on one or more (e.g., a combination of) factors related to sidelink (e.g., as described herein). A selection may be in the form of a static configuration, a mapping restriction, a decision taken at transmission time, and/or the like. A decision may depend on the relevant architecture (e.g., as described herein).

In examples, a WTRU may be (pre)configured and/or configured (e.g., by upper layer(s)) with a (e.g., static) mapping of a QoS flow, QoS profile, and/or specific condition that may be associated with a QoS flow to path (e.g., an SLRB or RLC entity) or path type. A path type may include one or more conditions described herein. A WTRU may be restricted, for example, to transmit a packet from a QoS flow (e.g., only) on the path based on a (e.g., static) mapping.

In examples, a WTRU may be (pre)configured and/or configured (e.g., by upper layer(s)) with an allowable mapping of a QoS flow, QoS profile, and/or a specific condition that may be associated with a QoS flow to multiple associated paths (e.g., SLRBs or RLC entities). A WTRU may select a transmission path for a packet from a QoS flow based on, for example, one or more conditions (e.g., as described herein).

In examples, a WTRU may be (pre)configured and/or configured (e.g., by upper layer(s)) with an L2 destination ID (e.g., an end-to-end L2 ID) or with multiple destination L2 IDs (e.g., a set of associated L2 destination IDs associated with different paths). A WTRU may allow transmission of a packet from a QoS flow on any path (e.g., SLRBs or RLC entities) that may be associated with the L2 destination ID(s).

In examples, a WTRU may be (pre)configured with a first SLRB having multiple paths, and a second SLRB having a single path. A WTRU may (e.g., at any time) be allowed to map and/or restricted from mapping a QoS flow to one or both SLRBs, for example, based on one or more conditions (e.g., as described herein).

Criteria may be provided for path selection. A WTRU may select a path for a packet of a QoS flow, or a QoS flow itself, for example, based on one or more (e.g., a combination) of the following criteria. (e.g., FIG. 8 at 818). A WTRU may use any combination of criteria for path selection. A combination may include, for examples, one or more of the following: (i) use of two or more criteria simultaneously for performing a decision; (ii) use of two or more criteria in sequence for performing a decision (e.g., if a first criteria does not indicate a path, a second criteria may be used to determine a path); (iii) use of one criteria for determining conditions to be satisfied (e.g., and/or parameters to check) for a second criteria; (iv) comparison of one criteria (e.g., and/or a result of one criteria) with another criteria (e.g., and/or a result of another criteria).

A WTRU may select a path based on a configuration. A WTRU may select a path that satisfies mapping/restrictions (e.g., as described herein). A WTRU may be configured (e.g., by the NW or by pre-configuration) with mapping/restrictions.

A WTRU may select a path based on the value of one or more QoS parameters in a QoS profile. A WTRU may select a path based on the QoS of the data to be transmitted. This may be realized in a number of ways. In examples, a WTRU may be (pre)configured with a rule associated with a QoS profile. A rule may allow or restrict a QoS flow on a specific path. A rule may be defined, for example, based on a criterion that may be associated with a path (e.g., a number of hops, CBR, measurements, etc.).

In an example, a WTRU may be configured with a maximum number of hops that may be used for a QoS profile. The WTRU may determine the number of hops for a (e.g., each) path (e.g., based on methods described herein). The WTRU may select a path with a number of hops less than or equal to the maximum number configured for the QoS profile of the packet/flow to be transmitted. A WTRU may be configured with a minimum channel measurement quality (e.g., CQI) for a QoS profile. The WTRU may select a path that meets the minimum channel measurement quality for the given QoS profile. A WTRU may be (pre)configured with a rule that may be associated with a (e.g., specific) QoS parameter or a value derived from QoS (e.g., LCH priority, L1 priority, reliability, range, etc.).

In an example, a WTRU may select a path (e.g., associated with a larger number of relay hops), for example, if the range requirement or range parameter is larger than a value. For example, a WTRU may be (pre)configured with a threshold range. A WTRU may prioritize or restrict selection of a path with a larger number of hops, for example, above the threshold range. In an example, a WTRU may select a path associated with a relay, for example, based on a combination of a range requirement and a distance to the relay. A WTRU may determine the distance to a relay associated with a specific path. The WTRU may transmit on that path, for example, if the range requirement is larger than the determined distance, or larger than a function of the determined distance (e.g., distance plus a threshold). In an example, a WTRU may be (pre)configured to select a first path for a first range/set of ranges and select a second path for a second range/set of ranges.

In an example, a WTRU may select a path (e.g., associated with a direct path, or associated with a path with a limited number of relays), for example, based on priority and/or latency. A WTRU may select a path, for example, if the LCH priority is lower than a threshold.

A WTRU may select a path based on a measured CBR (e.g., at the WTRU). In an example, a WTRU may select a first path (e.g., associated with a relayed link), for example, if the CBR is below a threshold. The WTRU may select a second path (e.g., associated with a direct or non-relayed link), for example, otherwise. In an example, a WTRU may be (pre)configured with an amount, ratio, portion, etc. of data that may be sent to a first path (e.g., associated with a relayed link or associated with a relayed link with a number of hops) for a (e.g., each) range of measured CBR. In an example, a WTRU may send to multiple paths if the CBR is below a threshold. In an example (e.g., where transmission to different relays/paths may occur on different resource pools/carriers), a WTRU may select a path with the lowest CBR (e.g., at a given time or over a measured time period). The range(s) of CBR and/or the conditions may (e.g., also) depend on other criteria (e.g., QoS, etc.).

A WTRU may select a path based on a transmission rate associated with a (e.g., each) path. A WTRU may select a path based on the transmission rate or usage rate on a (e.g., each) path. A selection may involve, for example, maintaining a similar rate of transmission on a (e.g., each) path. A selection may involve, for example, maintaining a transmission rate on a path below a threshold. A WTRU may measure transmission rate, for example, as one or more of the following: (i) the occupancy of transmission buffers (e.g., RLC buffer); (ii) the occupancy of sidelink resources that may be associated with transmissions over a specific path (e.g., a per destination ID CR); and/or (iii) the number of sidelink processes associated with each path.

In an example, a WTRU may be configured with a maximum CR for a specific path, and may transmit over a path up to the maximum CR. In an example, a WTRU may be configured to maintain (e.g., at most) a configured difference in a transmission rate between paths. In an example, a WTRU may be configured with a ratio of transmissions on each path. A ratio may depend on other criteria (e.g., as may be described herein). For example, a WTRU may be configured with a ratio to be maintained for a given QoS profile. For example, a WTRU may be configured with a ratio to be maintained for a (e.g., each) measured CBR. A WTRU may use a combination of criteria to determine a ratio.

A WTRU may select a path based on one or more transmission rate requirements that may be associated with the data. For example, a WTRU may select a path based on the transmission rate associated with the data (e.g., in the QoS profile). A selection may be based on other factors (e.g., the overall transmission rate on a path, CBR, CR, etc.). A WTRU may select the path for a QoS flow (e.g., from a set of allowable paths) based on, for example, whether mapping the QoS flow to the path results in a total transmission rate on the path that exceeds a threshold transmission rate. A transmission rate may be dependent on the CBR/CR measurements/reports.

A WTRU may select a path based on information that may be received from another WTRU (e.g., a relay WTRU). A WTRU may determine a path based on reception of information or an indication from another WTRU. A WTRU may be, for example, a relay WTRU associated with one or more configured paths.

In an example, a WTRU may increase/decrease a transmission rate on a path or move (e.g., all) transmissions to another path (e.g., for a time period), for example, based on indication received from a relay node associated with the path. An indication may be a sent, for example, in a control channel at the PHY, MAC, or RRC layers. An indication may be sent with data. An indication may include, for example, one or more of the following.

An indication may include, for example, a timer or an amount of time. For example, a WTRU may increase/decrease a transmission rate on a path, or move (e.g., all) transmissions to another path for an amount of time received in an indication.

An indication may include, for example, a desired rate or indication of a change of desired rate. A WTRU may change the rate on a path, for example, to meet the desired rate provided by a relay in an indication.

An indication may include, for example, a measurement (e.g., CBR, CR, CQI, RSRP, sensing results, HARQ statistics, buffering delay, etc.) made by the relay. A WTRU may increase/decrease the transmission rate on a path, or change to another path (e.g., following reception of a measurement), for example, if the measurement meets a preconfigured condition (e.g., CBR>threshold). A WTRU may combine received measurements from a relay WTRU with the WTRU's own measurements, for example, to determine a path (e.g., based on one or more combination rules for the measurements).

A WTRU (e.g., relay WTRU) may be configured to forward measurements to a source WTRU. In an example, a WTRU may be configured to (e.g., act as a relay to) forward one or more measurements (e.g., CBR, CR, CQI, RSRP, sensing results, HARQ statistics, buffering delay, etc.) received from a peer WTRU to another WTRU. A relay WTRU may be configured to serve as a relay WTRU, for example, for one or more L2 SRC ID and/or one or more unicast links (e.g., a source WTRU). A relay WTRU may receive measurements from another WTRU (e.g., another relay WTRU or a destination WTRU). A relay WTRU may be configured to forward measurements to a source WTRU, for example, based on a reception, or based on one or more conditions that one or more measurements meet the one or more conditions (e.g., before forwarding).

A path may be selected/avoided, for example, if a WTRUs own measurement or a measurement received from a relay is above/below a threshold. A path may be selected/avoided, for example, if a WTRUs own measurement and a measurement received from a relay is above/below a threshold. A WTRU may compute an average (e.g., a weighted average) of measurements of the WTRU's own link and link(s) reported by a relay over a specific path. A WTRU may select a path based on one or more rules (e.g., as described herein) that may be associated with measurements, for example, once the WTRU has computed an average measurement over each path. HARQ statistics may refer, for example, to one or more of HARQ ACK/NACK/DTX received and/or a number of HARQ retransmissions required that may exceed a threshold (e.g., consecutive or within a configured time).

An indication may include, for example, an indication by a peer WTRU that one or more measurements (e.g., CBR, CR, CQI, RSRP, sensing results, HARQ statistics, buffering delay, etc.) reached or exceeded a threshold. A measurement may be associated with a QoS of the data being relayed. A WTRU (e.g., a relay WTRU) may be configured to send an indication to a source WTRU. A WTRU may be configured, for example, with an event on one or more measurements (e.g., CBR, CR, CQI, RSRP, sensing results, HARQ statistics, buffering delay, etc.). A WTRU may send an indication to another WTRU, for example, based on a trigger of the event. An indication may be sent, for example, via a PC5-RRC message of a MAC CE. A WTRU (e.g., a relay WTRU) may send an indication to (e.g., all) TX WTRUs the WTRU's serves as a relay WTRU (e.g., for a specific SLRB). A WTRU may be configured, for example, to serve as a relay WTRU for one or more L2 SRC ID, or one or more unicast links. The WTRU may provide an indication to one or more (e.g., all) L2 SRC IDs or unicast links. The WTRU may be configured with a link-dependent event/trigger to send events. Conditions may be configured, for example, by a source WTRU (e.g., via PC5-RRC configuration).

An indication may include, for example, a change in TX parameters (e.g., for congestion control purposes). A WTRU may increase/decrease a transmission rate on a path, or change to another path, for example, following reception of an indication that the relay WTRU changed to a different set of TX parameters (e.g., one or more parameters). Parameters may include, for example, a modulation and coding scheme (MCS), a maximum number of retransmissions, a maximum transmit power, etc.

An indication may include, for example, an indication of link status (e.g., radio link failure (RLF) or related), which may be determined on the TX side at a relay. A WTRU may receive an indication of RLF from a relay (e.g., on a link associated with transmissions by the relay) or an indication of link problems (e.g., the number of HARQ discontinuous receptions (DTXs) exceeds a threshold). A WTRU may (e.g., based on reception of an indication from a relay WTRU associated with a path) stop transmissions to a path, (e.g., until reception of another indication, such as link problems no longer present).

An indication may include, for example, an indication of a buffering/queuing delay at the WTRU. For example, a WTRU may receive an indication of a buffering/queuing delay at a peer WTRU (e.g., from the peer WTRU). A WTRU may (e.g., based on reception of an indication from a relay) stop transmissions to a path, for example, if the queueing delay is above a threshold. A buffering/queuing delay may be associated with a QoS of the service/bearer(s) on the link.

A WTRU may select a path based on a feedback status. In an example, a WTRU may determine a path based on a statistic associated with HARQ feedback. A WTRU may change to a different path (e.g., for a time period), for example, if the WTRU receives a number of consecutive HARQ NACK and/or HARQ DTX.

A WTRU may select a path based on one or more measurements of a sidelink. In an example, a WTRU may determine a path based on a measurement made by the WTRU of a sidelink (e.g., associated with the path). A measurement may include, for example, an RSRP, CQI, or similar measurements that may be received from a peer WTRU on a path. A WTRU may change to a different path (e.g., for a time period or based on similar condition associated with the same or different measurement), for example, if the CQI on the measured path falls below a threshold (e.g., during a time period). A WTRU may select a path, for example, having the largest reported CQI. A WTRU may select a first path, for example, if the difference in CQI between the first path and a second path is above/below a threshold and the WTRU may, otherwise, for example, select a second path.

A WTRU may select a path based on a number of hops and/or a type of path. A WTRU may use, for example, the type of path (e.g., direct path to the destination WTRU or a relayed path through a relayed WTRU) and/or the number of hops (e.g., the number of relay WTRUs between the WTRU and the intended destination of the transmission) as factor(s) to determine a path. A WTRU may determine the number of hops or the path type from upper layers (e.g., by receiving a number of hops associated with an L2 destination ID or a QoS flow). A WTRU may (e.g., alternatively) obtain the number of hops from the network. A WTRU may (e.g., alternatively) receive a number of hops from a peer WTRU (e.g., from a relay WTRU associated with a path).

A WTRU may be configured with a rule to transmit data with certain criteria (e.g., QoS or other criteria), for example, so that the number of hops satisfies a criteria, or for a certain type, for example whether it is relayed or not, where the rule may be to allow or not allow the transmission to be relayed. In some examples, the rule may be limited to a certain type. The SDAP layer at the source WTRU may determine whether to map a (e.g., specific) QoS flow to an SLRB, for example, based on the number of hops that may be associated with the SLRB, one or more RLC entities of an SLRB, etc. A QoS flow may be mapped to an SLRB, for example, if there are at least x paths configured for the SLRB that have a hop count below a configured threshold. A QoS flow may be mapped to an SLRB, for example, if the number of hops of the longest path does not exceed a threshold. A QoS flow may be mapped to an SLRB, for example, if none of the paths of the SLRB is more than X hops.

A WTRU may select a path based on reception of data/control from a peer WTRU. In an example, a WTRU may select/use a path, for example, if the WTRU receives data over the same path. A WTRU may enable transmission to a path (e.g., L2 destination ID or unicast link), for example, if the WTRU receives a sidelink transmission from the path (e.g., L2 destination ID or unicast link). For example, a WTRU may disable transmissions to a path associated with a unicast link due to some factor/criteria described herein. The WTRU may (e.g., subsequently) re-enable transmissions to the same path, for example, following reception of data intended for the path. The WTRU may make a determination, for example, if the source L2 ID of the received data matches the L2 destination ID of the path to be enabled. A WTRU may perform/allow transmissions via a path, for example, without evaluation of other criteria, e.g., as long as the WTRU receives data from the path. A WTRU may (e.g., following expiry of a timer without reception of data) determine path selection based on another criteria (e.g., as described herein).

A WTRU may select a path based on criteria for the direct path. Criteria herein may refer to a criterion or criteria. A WTRU may be configured, for example, with an exception, identified criteria, and/or modified criteria for the direct path versus a relayed path. Criteria may be in the interest of selecting a direct path with a higher priority than a relayed path. Criteria may be in the interest of accounting for the lack of a decision criteria (e.g., relay CBR) associated with a direct path. Criteria may include, for example, one or more of the following. Criteria may include an offset of a measurement/value/threshold. For example, a WTRU may be configured with an offset or a different threshold that may be associated with a measurement criteria to be applied to the direct path compared with a relayed path. Criteria may include a default value to use for the direct path compared with a relayed path. A WTRU may be configured with a default value, or may derive a default value (e.g., based on the WTRU's own measurements/configuration), for example, to determine a specific value, measurement, and/or property for a direct path (e.g., if a specific criterion is not present for the direct path). A WTRU may use default CBR/CR or the WTRU's own measured CBR/CR, for example, to perform path decisions based on relay CBR/CR.

WTRU procedures may be provided for activation/deactivation of a path/link. For example, a WTRU may activate/deactivate an SL bearer/unicast link/L2 destination/RLC leg. A WTRU may perform activation/deactivation of a path for transmission (e.g., direct or via a relay), for example, so the path remains configured for (e.g., eventual) transmission/reception but may not be actively used for transmission (e.g., due to the presence of a better path or due to problems associated with the path).

In an example, a WTRU may activate/deactivate one or more (e.g., a combination) of the following (e.g., depending on the architecture): an SL radio bearer, a unicast link, an L2 destination (e.g., and/or a pair of source/destination L2 IDs), an RLC leg, and/or one or more QoS flows.

The term 'link' may be used to refer to any of the above. A deactivated link may be associated with reduced/suspended behavior on sidelink. A WTRU may, for example, associate one or more of the following behaviors with a deactivated link (e.g., at the TX WTRU or at the RX WTRU): (i) a WTRU may stop sending data SDUs (e.g., from SL DRB) and/or control SDUs (e.g., from SL SRB); (ii) a WTRU may not be allowed to use an (e.g., a specific) L2 ID for a (e.g., any) sidelink grant provided to it, or selected by the WTRU, (e.g., only) for the transmission of data (e.g., or for a subset of logical channels); (iii) a WTRU may not be allowed to select SDUs from logical channels associated with data and/or control; (iv) a WTRU may release one or more (e.g., all) sidelink processes that may be associated with a suspended link; (v) a WTRU may (e.g., autonomously) release one or more (e.g., all) SL configured grants that may be associated with a suspended link; (vi) a WTRU may stop performing RLM/RLF on the link; and/or (vii) a WTRU may stop decoding SCI for sidelink transmissions on an L1 destination ID that may be associated with the link.

A WTRU (e.g., despite reduced sidelink behavior on a deactivated link) may (e.g., be allowed to) perform, for example, one or more of the following normal operations on a deactivated link: (i) a WTRU may transmit PC5-RRC messages or may select data from LCHs that may be associated with sidelink control (e.g., PC5-RRC and/or PC5-S); (ii) a WTRU may transmit (e.g., one or more types of) sidelink RSRP measurements (e.g., a WTRU may be allowed to transmit periodic sidelink RSRP measurements or event-based RSRP measurements), for example, associated with one or more types/instances of an event); (iii) a WTRU may request sidelink CSI reports (e.g., and may send CSI-RS) to a link; and/or (iv) a WTRU may transmit sidelink CSI reports to a link (e.g., based on a request from a peer WTRU).

Triggers for deactivation may be provided. A WTRU may (e.g., autonomously) deactivate a link, for example, based on one or more (e.g., a combination) of the following events.

A WTRU may deactivate a link, for example, based on an event related to a measurement obtained from a peer WTRU or relay (e.g., CSI, RSRP). In examples, a WTRU may deactivate a link, for example, if the WTRU receives one or more measurements from the peer WTRU that meet a (pre)configured condition for deactivation. A WTRU may deactivate a link, for example, if the WTRU receives one or more (e.g., a number of consecutive) CSI reports indicating, for example, that CSI is less than a threshold and/or RSRP is less than a threshold. A WTRU may deactivate a link, for example, if the WTRU receives a percentage of reports indicating, for example, that CSI is less than a threshold and/or RSRP is less than a threshold. In examples, a WTRU may deactivate a link, for example, if one or more measurements based on a comparison of measurements from a first link with a second link. A WTRU may deactivate a link, for example, if CSI or RSRP measurements from a peer WTRU on a path are an amount (e.g., a threshold) lower than CSI or RSRP measurements from a peer WTRU on another link (e.g., for a consecutive number of reports or for a period of time).

A WTRU may deactivate a link, for example, based on an event that may be related to measurement of a signal transmitted by a peer WTRU on the link. A WTRU may deactivate a link, for example, if the WTRU measures the signal strength of a reference signal and/or a transmission from a peer WTRU (e.g., data, HARQ feedback, etc.) and the measured signal strength is below a certain power (e.g., RSRP).

A WTRU may deactivate a link, for example, based on an event related to RLF. A WTRU may deactivate a link, for example, if the link satisfies one or more conditions that may be related to an RLF of the link. A WTRU may be configured with one or more conditions indicative of one or more RLF conditions. The WTRU may deactivate a link, for example, if link conditions may (e.g., would otherwise) trigger RLF. For example, a WTRU may count the number of consecutive HARQ DTX from a peer WTRU and/or the number of (e.g., consecutive) RLC retransmissions to a peer WTRU. A WTRU may (e.g., under certain conditions) deactivate a link (e.g., instead of triggering RLF). A condition may include, for example, any of the following: (i) a WTRU may be configured with multiple paths for transmission to a destination WTRU (e.g., end to end L2 ID); (ii) a WTRU may be configured (e.g., by upper layers or NW) with a relay WTRU; and/or (iii) a WTRU may have at least one other path that does not meet the criteria for deactivation and/or RLF (e.g., as described herein). A WTRU may deactivate the link and perform one or more actions related to link deactivation (e.g., as described herein), for example, if the WTRU meets one or more of the conditions. The WTRU may trigger RLF, for example, if the WTRU does not meet the conditions.

A WTRU may deactivate a link, for example, based on an event related to a CBR (e.g., measured by the WTRU or by a peer WTRU). A WTRU may deactivate a link based on measurement of the CBR made by the WTRU and/or by the peer WTRU(s). A WTRU may be configured to deactivate a link, for example, if the measured CBR exceeds a threshold (e.g., for a time period). A WTRU may receive (e.g., regular) measurements of CBR from a peer WTRU (e.g., as described herein). A WTRU may deactivate a link, for example, if the CBR measurement report from the peer WTRU indicates a CBR above a threshold (e.g., for a time period or a number of reports). A threshold may depend on, for example, the QoS/SLRB configuration of the bearers/QoS flows that may be (e.g., are being) transmitted on the link. A WTRU may compare CBR measurements of peer WTRUs over different links. The WTRU may deactivate a link, for example, if the CBR received from the peer WTRU over the link is an (e.g., a threshold) amount higher than CBR over different links. A WTRU may deactivate a link, for example, if the CBR measured by the peer WTRU over a link is an (e.g., a threshold) amount higher than the WTRU's own CBR measurements.

A WTRU may deactivate a link, for example, based on an event related to a congestion indication from the peer WTRU over the link. A WTRU may deactivate a link, for example, based on reception of a message from a peer WTRU over a link related to congestion. A message from a peer may include, for example, one or more of the following messages: (i) the CR at the peer WTRU exceeds a threshold; (ii) the peer WTRU reached a buffering capacity; (iii) the peer WTRU reduced and/or changed one or more transmission parameters (e.g., maximum transmission power), for example, due to congestion control. A reduction and/or change in one/or more transmission parameters may be compared to a threshold that may depend on the QoS/SLRB characteristics of the bearers/flows over the link.

Triggers may be provided for activation. A WTRU may trigger activation of a link, for example, based on deactivation of another link (e.g., if the activated link does not meet one or more conditions for deactivation, for example, as described herein). A WTRU may trigger activation for a link that was previously deactivated, for example, if the condition associated with deactivation (e.g., or another other condition associated with deactivation, or related to a condition that may be described herein) is no longer met (e.g., for a time period). A WTRU may trigger activation of a link, for example, a (e.g., configured) time period after deactivation (e.g., of the link).

A condition for activation (e.g., measurements) may be dependent on a property that may be observed at the time of deactivation. A WTRU may activate a link, for example, if one or more of the CSI and/or RSRP measurements received from a peer WTRU are (e.g., threshold amount(s)) better than the value observed at the time of deactivation.

Conditions and triggers (e.g., as described herein) may be combined to determine conditions for activation. A WTRU may be configured with a first condition for deactivation and may be configured with a different condition for activation of the deactivated link (e.g., or vice versa). For example, a WTRU may trigger deactivation based on detection of RLF.

A WTRU may maintain a link in a deactivated state for a time period. A WTRU may (e.g., following expiry of a time period) activate the link, for example, if the measured CQI and/or RSRP received from the peer WTRU is above a threshold(s).

A WTRU may perform one or more actions, for example, based on activation and/or deactivation. A WTRU may (e.g., based on activation/deactivation), for example, perform one or more of the following: (i) remap one or more (e.g., all) QoS flows or SLRBs to a different link and/or next hop L2 ID (e.g., as described herein); (ii) reconfigure one or more (e.g., all) remapped SLRBs, for example, based on characteristics of the new link (e.g., number of hops, etc.); (iii) indicate deactivation to upper layers; (iv) indicate deactivation to the network (e.g., if the WTRU is in RRC_CONNECTED); (v) initiate connection establishment to the network; (vi) initiate a relay discovery procedure, which may consist of transmission of a broadcast message from upper layers or the AS layer (e.g., PC5-RRC message); (vii) inform a peer WTRU (e.g., relay) of the activation/deactivation; and/or (viii) trigger one or more measurements in a peer WTRU.

A WTRU may initiate measurement reporting on a link, for example, based on link status of another link. A WTRU may request measurements to (e.g., by or from) a peer WTRU (e.g., relay WTRU), for example, for the purpose of making an activation/deactivation decision. A trigger to request measurements on a link may depend, for example, on a link status for another link.

In an example, a WTRU may send a measurement request message (e.g., or initiate measurement reporting by a peer WTRU) on a first link, for example, based on the link status of a second link. For example, the first link may be associated with a deactivated link, while the second link may be associated with an activated link. Transmission of a measurement request message on a first link may be based on, for example, one or more (e.g., a combination) of the following triggers.

Transmission of a measurement request message on a first link may be based on, for example, one or more measurements (e.g., reported by the WTRU) on the second link being above/below a threshold (e.g., a QoS dependent threshold), for example, for a time period or a for a number of measurements reported. Measurements may include, for example, one or more of the following: a CBR, CR, CQI, RSRP, sensing results, HARQ statistics, buffering delay, etc.

Transmission of a measurement request message on a first link may be based on, for example, a HARQ status on a second link (e.g., a number of received NACK and/or DTX and/or ACK, for example, consecutive or over a configured time) being above/below a threshold.

Transmission of a measurement request message on a first link may be based on, for example, measurements (e.g., made by the WTRU) of a reference signal associated with a transmission made by the peer WTRU over the second link. A WTRU may measure a CSI RS transmitted by a peer WTRU (e.g., for CQI reporting) and may initiate transmission of a measurement request on the first link, for example, if the RSRP of the RS is below a threshold (e.g., a QoS dependent threshold).

Transmission of a measurement request message on a first link may be based on, for example, reception of a message (e.g., may or may not be a measurement report) from a peer WTRU on the second link. A message may be sent by a peer WTRU, for example, following a trigger configured at the peer WTRU (e.g., as described herein). A trigger may include, for example, one or more of the following: (i) a value of a measurement made/received by the peer WTRU is above/below a threshold (e.g., CBR, CR, CQI, RSRP, sensing results, HARQ statistics, buffering delay, etc.); (ii) a peer WTRU experiences a TX-based RLF; (iii) one or more buffers associated with relaying at the peer WTRU exceed a threshold; and/or (iv) a value of a TX parameter by the peer WTRU is limited (e.g., to a value), for example, due to congestion control.

A WTRU may disable/request a stop to measurements on a first link, for example, if the first link improves (e.g., based on similar conditions described above).

Measurements requested by a WTRU to a peer WTRU on a first link may be for periodic and/or event-based measurements of, for example, one or more of the following: CBR, CR, CQI, RSRP, sensing results, HARQ statistics, buffering delay, etc.

A WTRU may determine an initial activation/deactivation state. A WTRU may (e.g., based on a configuration of a path, such as an RLC leg, SLRB, etc.), determine an initial activation state for a path based on, for example, one or more (e.g., a combination) of the following: (i) the number of paths (e.g., already) configured/activated (e.g., associated with the destination ID); (ii) a value of a quality metric (e.g., as discussed herein) that may be associated with one or more other paths (e.g., already) configured/activated (e.g., associated with a destination ID); (iii) a configuration property that may be associated with the SLRB, one or more of the QoS flows mapped to the SLRB, and/or a destination; (iv) the type of path (e.g., whether direct or via a relay), where a direct SLRB or path may (e.g., always) be created in an activated state, and where a relayed SLRB or path may (e.g., always) be created in a deactivated state; and/or (v) the number of hops associated with an SLRB (e.g., a path with more than X hops may be configured initially in a deactivated state).

A WTRU may indicate an initial activation/deactivation state of path to a peer WTRU in a sidelink configuration message, for example, based on path creation (e.g., when the path is created).

WTRU procedures may be provided for fast establishment/switching of a unicast link via sidelink WTRU to WTRU Relays. Interruption time on a sidelink may be reduced, for example, by (e.g., a WTRU) initiating a lower-layer configuration of an SLRB (e.g., an RLC bearer and/or logical channel) over a different path, e.g., so that the SRLB may be used to transmit on a different path. A WTRU may initiate an RLC bearer over a different path or link, for example, prior to the failure of the current path/link. A WTRU may (e.g., if the current path/link is deemed failed or considered unusable by a WTRU) perform transmission of the SLRB over the preconfigured or pre-established lower-layer entity (e.g., RLC entity and/or logical channel). In examples, a lower-layer configuration may be (e.g., be assumed to be) an RLC entity. However, the same example implementations may be applied to an architecture where the lower layer configuration consists of other layers (e.g., PDCP/RLC/MAC/PHY or MAC/PHY).

A WTRU may send a (e.g., partial) reconfiguration message to another WTRU, e.g., to set up a backup RLC bearer. In examples, a WTRU may initiate transmission of a reconfiguration message to another (e.g., relay) WTRU. A WTRU may transmit to the relay WTRU a partial reconfiguration message, for example, including (e.g., only) a configuration for lower layers (e.g., RLC, MAC, and PHY). The WTRU may determine the intended recipient of a reconfiguration message, for example, based on an association of a relay WTRU with an end-to-end L2 ID or end-to-end WTRU. For example, a WTRU may have a unicast link with an end-to-end WTRU (e.g., a specific L2 ID). A WTRU may (e.g., for the specific end-to-end WTRU or L2 ID) determine an association with a relay WTRU, for example, based on one or more of the following.

A WTRU may determine an association with a relay WTRU, for example, based on an indication from upper layers. For example, a WTRU may be configured (e.g., by upper layers) with one or more relay WTRUs (e.g., L2 IDs). The WTRU may have a unicast link with the one or more relay WTRUs at upper layers. A WTRU may receive (e.g., from upper layers) the L2 ID(s) of a destination WTRU (e.g., end to end destination) that the relay WTRU can serve. The WTRU may select one or more of the relays, for example, to serve as the associated relay for the end-to-end unicast link.

A WTRU may determine an association with a relay WTRU, for example, based on an indication from the network. For example, a WTRU may be configured by the network with one or more relay WTRUs (e.g., L2 IDs). The one or more relay WTRUs may be used, for example, as an associated relay WTRU(s), e.g., for a given end-to-end WTRU (e.g., end-to-end L2 ID).

A WTRU may determine an association with a relay WTRU, for example, based on information from a relay WTRU. For example, a WTRU may receive a message from another WTRU (e.g., a potential relay) with the L2 Is of the WTRUs (e.g., end-to-end WTRUs) that the WTRU can serve (e.g., as described herein).

A WTRU may determine an association with a relay WTRU, for example, based on a measurement of a transmission by the relay. For example, a WTRU may perform one or more measurements of a transmission made by one or more relay WTRUs (e.g., indicated by upper layers). The WTRU may determine whether a relay may be an associated relay, for example, based on a (e.g., configured) condition for the measurement(s) (e.g., RSRP of the relay WTRUs transmission is larger than a threshold).

A WTRU may transmit partial reconfiguration information (e.g., an RLC configuration, a MAC configuration, and/or a PHY configuration) in a reconfiguration message for one or more (e.g., each) of the SLRBs currently configured with an end-to-end L2 destination ID. A WTRU configured with a unicast link to an end-to-end L2 ID may, for example, send an RLC configuration, a MAC configuration, and/or a PHY configuration to one or more of the associated relay WTRUs.

Triggers may be provided to establish an RLC entity and/or send a backup RLC reconfiguration. A WTRU may establish a lower-layer entity (e.g., RLC entity) for a backup lower layer (e.g., RLC) bearer. The WTRU may establish an entity, for example, based on reception of a partial reconfiguration information message (e.g., for the relay WTRU) or based on reception of a confirmation of a partial reconfiguration message (e.g., for the source WTRU). A WTRU may (e.g., alternatively) initiate transmission of a partial reconfiguration message and/or establishment of an RLC entity, for example, based on one or more (e.g., a combination) of the following triggers: (i) an upper layer indicates initiation/completion of link establishment with a relay WTRU; (ii) a relay WTRU satisfies a measurement condition described herein; and/or (iii) a (e.g., another) relay WTRU can no longer serve as an associated relay (e.g., it is removed by upper layers, or it no longer satisfies the measurement condition(s), for example, as described herein). In examples, similar conditions described for deactivation may (e.g., also) serve as a condition for a (e.g., another) relay WTRU to no longer serve as an associated relay, which may (e.g., in turn) trigger transmission of a partial reconfiguration to a first WTRU and/or establishment of a new RLC entity. A WTRU may be configured to maintain a (e.g., single) backup RLC entity/RLC bearer, and may initiate creation of a new entity/bearer, for example, if an existing entity/bearer no longer meets the required conditions (e.g., as described herein).

A WTRU may transmit configuration information for a (e.g., each) of the SLRBs associated with an L2 ID. A WTRU may (e.g., alternatively) transmit configuration information for (e.g., only) certain SLRBs. For example, a WTRU may be configured (e.g., in an SLRB configuration) with a flag indicating whether the SLRB requires creation of a backup RLC entity/bearer.

A WTRU may change an RLC entity/bearer associated with an SLRB from a first established RLC entity to another established RLC entity. A WTRU may move transmissions from a first link (e.g., RLC bearer) to another link (e.g., RLC bearer), for example, based on one or more triggering conditions. A WTRU may (e.g., in doing so) change the association of an SLRB (e.g., SDAP and PDCP) from a first RLC entity (e.g., a previously active RLC entity) to another RLC entity (e.g., a backup RLC entity). The WTRU may change an SLRB entity from an active RLC entity to a backup RLC entity, for example, based on one or more triggers (e.g., as described herein for path selection or activation/deactivation). A WTRU may receive a condition and/or or the parameters for a condition, for example, from the network (e.g., along with a configuration of a backup RLC bearer).

A backup RLC entity may become the new active RLC entity, for example, based on a change of RLC entity. A WTRU may replace the backup RLC entity, based on the change. A WTRU may make the original active RLC entity the backup RLC entity. A change may initiate configuration of a new RLC entity, and/or the original active RLC entity may be removed. A WTRU may be configured to select between multiple options (e.g., to make an original active RLC a backup RLC entity or to remove the original active RLC entity), for example, based on one or more of the following. A decision may be made, for example, based on whether the original RLC entity corresponds to a relayed or direct path. For example, a WTRU may receive (e.g., from upper layers) an indication of whether an L2 ID corresponds to a direct path or to a relayed path associated to another direct path. A WTRU may (e.g., always) change the active path to the new backup path, for example, if the path corresponds to a direct path. A decision may be made, for example, based on one or more conditions (e.g., with respect to the quality of the path at the time of the switch). A WTRU may determine whether to remove or maintain as a backup entity the RLC entity associated with the previous active path, for example, based on one or more conditions (e.g., as may be discussed herein, such as CSI measurements, RSRP measurements, CRB, etc.). For example, a WTRU may be configured with a first condition to change the active RLC entity. The WTRU may be configured with a second condition to determine (e.g., based on a change of the active RLC entity) whether the previous active RLC entity should be removed or maintained as a backup RLC entity.

Examples are provided for link/SLRB creation and configuration. A WTRU may initiate unicast link establishment with one or more peer WTRUs based on, for example, the QoS profile(s) to be supported for transmission, the mapping of the QoS profile(s) to a (pre)configured SLRB, and/or the presence of one or more WTRU-to-WTRU relays for transmission of the QoS flows to the SLRB. A WTRU may receive an association of an L2 ID for an end-to-end destination and one or more relay L2 IDs (e.g., for which upper layers may have initiated a unicast link for relaying to serve as a relay to the end-to-end destination). A WTRU may (e.g., further) receive an indication of whether the direct link (e.g., to the end-to-end destination) is active.

A WTRU may receive multiple SLRB configurations from the network or pre-configuration. A WTRU may select a configuration, for example, based on the number of available paths to the destination (e.g., indicated by upper layers). A WTRU may select a first configuration for an SLRB that may be used for a QoS flow, for example, if the first configuration allows the use of a number of paths that match the number of active paths (e.g., indicated by the upper layers).

A WTRU may initiate a configuration procedure to an (e.g., each of the) indicated L2 ID(s) (path(s)), for example, by providing the (pre)configured SLRB parameters to a peer WTRU for the SLRB that can carry the path. The WTRU may create a new RLC entity associated with the PDCP entity for the SLRB, for example, based on successful configuration of the peer WTRU (e.g., reception of a sidelink reconfiguration confirmation message).

A WTRU may perform re-configuration of one or more RLC entities that may be associated with an SLRB, for example, based on an indication (e.g., by upper layers, or the NW) or based on occurrence of an RLF on a path. A WTRU may initiate a sidelink configuration with a new path (e.g., a new relay), for example, based on addition of a path from the NW or upper layers. The WTRU may add an RLC entity to the existing SLRB, for example, based on a successful configuration. A WTRU may remove an RLC entity, for example, based on removal of a path (e.g., by RLF). Addition/removal of a path may (e.g., further) initiate reconfiguration of an (e.g., each) individual path. A WTRU may select a new SLRB configuration, for example, based on a new number of paths. A WTRU may initiate a sidelink configuration procedure (e.g., to each peer WTRU of each path), for example, if the new SLRB configuration (e.g., based on the new number of paths) needs/requires a new set of SLRB parameters to be configured at the peer WTRU.

Flow to bearer mapping rules (e.g., number of hops) may be provided. A WTRU may be configured with a new QoS flow to bearer mapping rule, which may be associated with the number of hops in one or more of the RLC entities for an SLRB. A WTRU may be configured with a mapping of QoS profiles to SLRB configuration. An SLRB configuration may indicate an applicable number of hops or an allowable number of hops on which an SLRB configuration may be applied. An SLRB configuration may (e.g., alternatively) be independent of the number of hops. The WTRU may be configured, for example, with a QoS profile and a maximum number of hops (e.g., for which the QoS profile may be mapped to the SLRB). The WTRU may determine the number of hops for the path from upper layers (e.g., along with the L2 ID information). The SDAP layer may be configured to allow mapping of a QoS flow to an SLRB, for example, based on whether the SLRB (e.g., created through a specific path) may exceed the maximum number of hops. A limitation on the maximum number of hops may include, for example, one or more of the following: (i) a maximum number of hops that an (e.g., any one) RLC entity within the bearer (e.g., a single path) can have; (ii) a maximum number of hops that the majority of paths can have; and/or (iii) a maximum number of hops that at least x paths can have, where x may be configured/configurable.

Activation/deactivation procedures, rules and criteria may be provided. A WTRU may create an RLC entity, for example, for a (e.g., each) path of a created SLRB. A WTRU may create an RLC entity, for example, (e.g., only) after successful configuration of a peer WTRU in the unicast link. A WTRU may be configured to activate/deactivate a (e.g., each) path/RLC entity of a SLRB.

A WTRU may be configured to activate (e.g., only) a single path of an SLRB (e.g., and deactivate all other paths that may be active). A WTRU may (e.g., alternatively) be configured to activate multiple paths of an SLRB. A WTRU may indicate activation/deactivation of a path to a peer WTRU, for example, in an initial configuration message (e.g., in PC5-RRC). A WTRU may be configured with a rule indicating, for example, which path to activate/deactivate (e.g., initially). A rule may be based on the number of hops in a (e.g., each) path (e.g., activate the path with the smaller number of hops).

A WTRU may configure measurement reporting of CBR and CR for one or more (e.g., all) paths (e.g., activated and deactivated paths) from the peer WTRU of a (e.g., each) path. A WTRU may perform data transmission of QoS flows mapped to an SLRB, for example, (e.g., only) through paths that may be activated at a given time.

A WTRU routing decision may be determined. A WTRU may compute a ratio of data to be transferred to an (e.g., each) activated path, for example, based on the ratio of CBR/CR reported for a (e.g., each) path. For example, a WTRU may determine the ratio of CBR between a first path and a second path (e.g., based on a report from a peer WTRU on the path). A WTRU may transmit data over the first and second path for a (e.g., specific) destination, for example, so that the ratio of the data transmitted over the first and second paths is based on (e.g., matches) the ratio or a function of the ratio of the reported CBR.

The SDAP layer in the WTRU may be configured with a QoS flow to SLRB mapping rule, which may map a QoS low to an SLRB based on, for example, the number of hops associated with the path of the SLRB. A rule may be, for example, inherent in the SLRB configuration. A WTRU may be configured with multiple SLRB configurations, where, for example, each SLRB configuration may correspond to a different number of hops. A WTRU may receive (e.g., within a (each) SLRB configuration) the allowable QoS profiles associated with a (e.g., each) flow that may be allowed on the SLRB configuration. A QoS profile (e.g., associated with a QoS flow) may be allowed for a configuration with a first number of hops, and not allowed for a another (e.g., larger) number of hops.

A QoS flow may be allowed on multiple SLRBs and/or paths, for example, based on a mapping. A WTRU may select one or more of the SLRBs/paths to route the QoS flow, for example, based on one or more rules (e.g., as described herein).

Accordingly, systems, methods, and instrumentalities are described herein associated with service continuity using WTRU relays. A source WTRU may establish a new communication path for an established radio bearer associated with communicating with a destination WTRU. The source WTRU may identify a relay that is adapted to provide relaying to the destination WTRU. The source WTRU may determine if the identified relay may be used to provide a path to the destination WTRU by, for example, determining if a parameter such as, for example, QoS, CBR, or hop count, associated with the relay satisfies one or more thresholds associated with the radio bearer. If so, the source WTRU may reconfigure the radio bearer to accommodate the relay by triggering a sidelink reconfiguration. If the reconfiguration of the radio bearer is successful, the source WTRU may add a path associated with the relay to the radio bearer by, for example, adding a radio link control (RLC) entity and associating the RLC entity with the relay. The source WTRU may transmit data to the destination WTRU via the path associated with the relay.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising:
a processor configured to:
establish a radio bearer for communicating with a communication device, a first path being associated with the radio bearer for communicating with the communication device;
receive information that indicates to add a second path for communication with the communication device via a relay device;
receive information that configures a radio link control (RLC) channel between the WTRU and the relay device for the second path;
send a reconfiguration request to the relay device, the reconfiguration request indicating to the relay device to configure the RLC channel between the WTRU and the relay device;
receive a reconfiguration response from the relay device;
receive information that associates the RLC channel between the WTRU and the relay device with the radio bearer; and
on a condition that the reconfiguration response indicates successful reconfiguration:
configure, at the WTRU, the RLC channel between the WTRU and the relay device; and
transmit data from the radio bearer to the communication device via the first path and via the second path using the relay device.

2. The WTRU of claim 1, wherein the radio bearer is a sidelink radio bearer (SLRB).

3. The WTRU of claim 1, wherein the communication device is a WTRU.

4. The WTRU of claim 1, wherein the communication device is a network device.

5. The WTRU of claim 1, wherein the first path is a direct path.

6. The WTRU of claim 1,
wherein the processor configured to receive the information that indicates to add the second path for communication with the communication device via the relay device is further configured to receive from an upper layer the information that indicates to add the second path for communication with the communication device via the relay device.

7. The WTRU of claim 1,
wherein the processor configured to receive the information that configures the RLC channel between the WTRU and the relay device for the second path is further configured to receive an identifier associated with the RLC channel between the WTRU and the relay device for the second path.

8. The WTRU of claim 1,
wherein the reconfiguration request is a sidelink reconfiguration request.

9. The WTRU of claim 1, where the processor is further configured to receive the reconfiguration response from the relay device is further configured to receive information indicating successful reconfiguration.

10. The WTRU of claim 1,
wherein the processor configured to configure the RLC channel between the WTRU and the relay device is further configured to:
add an RLC entity; and
associate the RLC entity with the relay device.

11. The WTRU of claim 1,
wherein the processor configured to transmit data from the radio bearer to the communication device via the first path and via the second path using the relay device is further configured to transmit data from the radio bearer via the second path using an L2 destination identifier.

12. A method comprising:
a wireless transmit/receive unit (WTRU) establishing a radio bearer for communicating with a communication device, a first path being associated with the radio bearer for communicating with the communication device;
the WTRU receiving information that indicates to add a second path for communication with the communication device via a relay device;
the WTRU receiving information that configures a radio link control (RLC) channel between the WTRU and the relay device for the second path;
the WTRU sending a reconfiguration request to the relay device, the reconfiguration request indicating to the relay device to configure the RLC channel between the WTRU and the relay device;
the WTRU receiving a reconfiguration response from the relay device;
the WTRU receiving information that associates the RLC channel between the WTRU and the relay device with the radio bearer; and
on a condition that the reconfiguration response indicates successful reconfiguration:

the WTRU configuring the RLC channel between the WTRU and the relay device, and transmitting data from the radio bearer to the communication device via the first path and via the second path using the relay device.

13. The method of claim 12,
wherein receiving the information that indicates to add the second path for communication with the communication device via the relay device comprises receiving from an upper layer the information that indicates to add the second path for communication with the communication device via the relay device.

14. The method of claim 12,
wherein receiving the information that configures the RLC channel between the WTRU and the relay device for the second path comprises receiving an identifier associated with the RLC channel between the WTRU and the relay device for the second path.

15. The method of claim 12,
wherein the reconfiguration request is a sidelink reconfiguration request.

16. The method of claim 12, wherein the radio bearer is a sidelink radio bearer (SLRB).

17. The method of claim 12, wherein the communication device is a WTRU.

18. The method of claim 12, wherein the communication device is a network device.

19. The method of claim 12, further comprising:
wherein receiving the reconfiguration response from the relay device further comprises receiving information indicating successful reconfiguration.

20. A wireless transmit/receive unit (WTRU) comprising:
a processor configured to:
establish a sidelink radio bearer (SLRB) for communicating with a destination WTRU, a first path being associated with the SLRB for communicating with the destination WTRU;

receive information that indicates to add a second path for communication with the destination WTRU via a relay device;

receive information that configures a radio link control (RLC) channel between the WTRU and the relay device for the second path;

send a reconfiguration request to the relay device, the reconfiguration request indicating to the relay device to configure the RLC channel between the WTRU and the relay device;

receive a reconfiguration response from the relay device;

receive information that associates the RLC channel between the WTRU and the relay device with the SLRB; and on a condition that the reconfiguration response indicates successful reconfiguration:

configure, at the WTRU, the RLC channel between the WTRU and the relay device; and transmit data from the SLRB to the destination WTRU via the first path and via the second path using the relay device.

* * * * *